(12) United States Patent
Islam et al.

(10) Patent No.: US 11,792,794 B2
(45) Date of Patent: Oct. 17, 2023

(54) SYSTEM INFORMATION FOR ACCESS AND BACKHAUL

(71) Applicant: QUALCOMM Incorporated, San Diego, CA (US)

(72) Inventors: Muhammad Nazmul Islam, Littleton, MA (US); Navid Abedini, Basking Ridge, NJ (US); Junyi Li, Fairless Hills, PA (US); Karl Georg Hampel, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/578,139

(22) Filed: Jan. 18, 2022

(65) Prior Publication Data
US 2022/0141858 A1    May 5, 2022

Related U.S. Application Data

(62) Division of application No. 16/358,507, filed on Mar. 19, 2019, now Pat. No. 11,252,748.
(Continued)

(51) Int. Cl.
*H04W 72/1273* (2023.01)
*H04W 76/12* (2018.01)
(Continued)

(52) U.S. Cl.
CPC .... *H04W 72/1273* (2013.01); *H04B 7/15507* (2013.01); *H04W 72/27* (2023.01);
(Continued)

(58) Field of Classification Search
CPC . H04W 48/12; H04W 76/12; H04W 7/15507; H04W 7/15528; H04W 72/1273;
(Continued)

(56) References Cited

U.S. PATENT DOCUMENTS

| 2011/0051654 A1* | 3/2011 | Blankenship | H04B 7/2606 370/315 |
| 2012/0033588 A1* | 2/2012 | Chung | H04L 1/1812 370/280 |

(Continued)

FOREIGN PATENT DOCUMENTS

| CN | 105103636 A | 11/2015 |
| CN | 105721037 A | 6/2016 |

(Continued)

OTHER PUBLICATIONS

AT & T: "Summary of 7.7.1 Enhancements to Support NR Backhaul Links," 3GPP Draft; R1-1805673 Summary of 7_7_1-IAB-PHY VE00, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 19, 2018, XP051427800, 13 pages, Retrieved from the Internet: URL: http://www.3gpp.org/ftp/Meetings%5F3GPP%5FSYNC/RAN1/Docs/ [retrieved on Apr. 19, 2018].
(Continued)

*Primary Examiner* — Redentor Pasia
(74) *Attorney, Agent, or Firm* — Holland & Hart LLP

(57) ABSTRACT

Methods, systems, and devices for wireless communications are described that provide for system information (SI) for access and backhaul. An access node (AN) may provide SI to devices within its cell indicating communication procedure configurations. The AN may provide SI to devices that is specific to whether the communication procedure is an access procedure or a backhaul procedure. The AN may transmit a common master information block (MIB) directing the devices within its cell to a search space in order to receive the remaining SI. The search space may be shared between access devices and backhaul devices or alternatively may be separate between access and backhaul devices. The remaining SI may not be shared between access and
(Continued)

backhaul devices. The devices may determine different configurations as defined by the SI from the AN for communications procedures based on whether the procedure is an access procedure or a backhaul procedure.

24 Claims, 16 Drawing Sheets

Related U.S. Application Data

(60) Provisional application No. 62/668,085, filed on May 7, 2018.

(51) Int. Cl.
*H04B 7/155* (2006.01)
*H04W 72/27* (2023.01)
*H04W 72/53* (2023.01)
*H04W 72/50* (2023.01)

(52) U.S. Cl.
CPC ......... *H04W 72/53* (2023.01); *H04W 72/535* (2023.01); *H04W 76/12* (2018.02)

(58) Field of Classification Search
CPC ......... H04W 72/0426; H04W 72/0493; H04W 72/1257
See application file for complete search history.

(56) References Cited

U.S. PATENT DOCUMENTS

| | | | |
|---|---|---|---|
| 2012/0069790 A1* | 3/2012 | Chung | H04W 72/042 370/329 |
| 2012/0099518 A1 | 4/2012 | Park et al. | |
| 2012/0113884 A1 | 5/2012 | Park et al. | |
| 2012/0114021 A1 | 5/2012 | Chung et al. | |
| 2012/0147794 A1* | 6/2012 | Chung | H04L 5/0057 370/280 |
| 2012/0176958 A1 | 7/2012 | Queseth et al. | |
| 2012/0218964 A1* | 8/2012 | Park | H04B 7/155 370/329 |
| 2012/0264368 A1 | 10/2012 | Aminaka et al. | |
| 2013/0163551 A1 | 6/2013 | He et al. | |
| 2013/0294332 A1 | 11/2013 | Kim et al. | |
| 2013/0322324 A1 | 12/2013 | Kim et al. | |
| 2014/0022981 A1 | 1/2014 | Kim et al. | |
| 2014/0086173 A1* | 3/2014 | Sadeghi | H04W 72/048 370/328 |
| 2015/0230210 A1* | 8/2015 | Lee | H04W 72/23 370/329 |
| 2015/0236777 A1* | 8/2015 | Akhtar | H04B 7/15528 455/450 |
| 2016/0020883 A1 | 1/2016 | Golitschek Edler Von Elbwart et al. | |
| 2016/0374138 A1 | 12/2016 | Dai et al. | |
| 2017/0111804 A1* | 4/2017 | Mukherjee | H04W 16/26 |
| 2018/0063865 A1* | 3/2018 | Islam | H04L 5/0091 |
| 2018/0092141 A1 | 3/2018 | Wei et al. | |
| 2018/0309560 A1* | 10/2018 | Tang | H04L 5/0005 |
| 2019/0149365 A1 | 5/2019 | Chatterjee et al. | |
| 2019/0150073 A1 | 5/2019 | Tiirola et al. | |
| 2019/0215098 A1 | 7/2019 | Tiirola et al. | |
| 2019/0342904 A1 | 11/2019 | Islam et al. | |
| 2020/0015208 A1* | 1/2020 | Noh | H04L 27/261 |
| 2020/0169956 A1 | 5/2020 | Sun et al. | |

FOREIGN PATENT DOCUMENTS

| | | |
|---|---|---|
| EP | 2410668 A2 | 1/2012 |
| WO | WO2013111601 A1 | 8/2013 |

OTHER PUBLICATIONS

Ericsson: "Summary of 7.2.3.1 Enhancements to Support NR Backhaul Links", 3GPP Draft, 3GPP TSG RAN WG1 Meeting #94bis, R1-1811844, 3rd Generation Partnership Project (3GPP), Mobile Competence Centre, 650, Route Des Lucioles, F-06921 Sophia-Antipolis Cedex, France vol. RAN WG1, No. Chengdu, China, Oct. 8, 2018-Oct. 12, 2018, Oct. 9, 2018, XP051519169, 21 pages, Retrieved from the Internet: URL:http://www.3gpp.org/ftp/tsg%5Fran/WG1%5FRL1/TSGR1%5F94b/Docs/R1%2D1811844%2Ezip [retrieved on Oct. 9, 2018], Chapter 3 "Dynamic Resource Allocation between Backhaul and Access Links".

Huawei: "Using Standalone IAB Node for RN-DC Access Link," 3GPP Draft; R3-182000 Using Standalone IAB Node for EN DC in Access Link, 3rd Generation Partnership Project (3GPP), Mobile Competence Centre; 650, Route Des Lucioles; F-06921 Sophia-Antipolis Cedex, vol. RAN WG2, No. Sanya, China; Apr. 16, 2018-Apr. 20, 2018, Apr. 15, 2018, XP051430159, 3 pages, Retrieved from the internet: URL: http://www.3gpp.org/ftp/Meetings%5F3GPP%5FSYNC/RAN3/Docs/ [retrieved on Apr. 15, 2018].

Interdigital Inc: "On SSB and RMSI for IAB Initial Access in NR", 3GPP Draft; R1-1900790, 3rd Generation Partnership Project (3GPP), Mobile Competence Centre, 650, Route Des Lucioles. F-06921 Sophia-Antipolis Cedex. France vol. RAN WG1, No. Taipei. Taiwan; Jan. 21, 2019-Jan. 25, 2019 Jan. 20, 2019, XP051593636, Retrieved from the Internet: URL:http://www.3gpp.org/ftp/Meetings%5F3GPP%5FSYNC/RAN1/Docs/R1%2D1900790%2Ezip [retrieved on Jan. 20, 2019], 3 pages.

International Preliminary Report on Patentability—PCT/US2019/023151, The International Bureau of WIPO—Geneva, Switzerland, dated Nov. 19, 2020.

International Search Report and Written Opinion—PCT/US2019/023151—ISA/EPO—Sep. 2, 2019.

Partial International Search Report—PCT/US2019/023151—ISA/EPO—dated Jun. 13, 2019.

HUAWEI., et al., "Evaluation on the Dynamic and Flexible Resource Allocation in IAB", 3GPP TSG-RAN WG1 Meeting #92bis, 3GPP Draft; R1-1804303, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 7 Pages, XP051426591, Sections 1 and 2.

Qian Z., et al., "Reviews of D2D Technology for 5G Communication Networks", Journal on Communications, Jul. 25, 2016, vol. 37, No. 7, pp. 1-14.

\* cited by examiner

SYSTEM INFORMATION FOR ACCESS AND BACKHAUL

CROSS REFERENCES

The present Application for Patent is a Divisional of U.S. patent application Ser. No. 16/358,507 by ISLAM, et al., entitled "SYSTEM INFORMATION FOR ACCESS AND BACKHAUL" filed Mar. 19, 2019, which claims the benefit of U.S. Provisional Patent Application No. 62/668,085 by ISLAM et al., entitled "SYSTEM INFORMATION FOR ACCESS AND BACKHAUL," filed May 7, 2018, assigned to the assignee hereof, and expressly incorporated by reference herein.

BACKGROUND

The following relates generally to wireless communications, and more specifically to system information (SI) for access and backhaul.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems, such as those operating in a millimeter wave (mmW) spectrum, may include access nodes (ANs) to facilitate wireless communication between a UE and the network. In some cases, an anchor AN may have a high-capacity, wired, backhaul connection (e.g., fiber) to the network, while communicating simultaneously with one or more ANs (e.g., relay devices) or UEs. In some examples, an anchor AN may be referred to as an integrated access backhaul (IAB) donor node. A network that supports communications between an AN and a UE may be referred to as an access network, while a network that supports communications between one or more ANs may be referred to as a backhaul network. In deployments supporting both access and backhaul (e.g., in an IAB network), standard random access channel (RACH) configurations may be constrictive. For example, timing and power differences between access and backhaul RACH may lead to increased multiplexing complexity at an AN.

SUMMARY

The described techniques relate to improved methods, systems, devices, and apparatuses that support system information (SI) for access and backhaul. Generally, the described techniques provide for SI that is specific to access or backhaul procedures. In some cases, an access node (AN) may send random access channel (RACH) configuration information to devices within its cell. The separate SI for access and backhaul procedures may indicate different RACH configurations for ANs depending on whether the RACH procedure is associated with backhaul or access.

In some examples, a receiving AN may indicate SI to the devices in a cell via a common master information block (MIB). The MIB may direct devices to a search space allowing them to receive additional SI. The search space may be the same search space for both access and backhaul, or alternatively, the common MIB may direct devices to separate search spaces for access and backhaul procedures. The receiving AN may indicate the remaining SI to the devices such that the remaining SI is specific to backhaul or access procedures. The separate SI for backhaul and access procedures may enable a receiving AN to receive and/or transmit RACH preambles for both access and backhaul procedures.

A method of wireless communications is described. The method may include receiving, at a relay device in a wireless network, a backhaul SI configuration from a network node in the wireless network, determining, based on the backhaul SI configuration, backhaul SI for communication with the network node or another network node of the wireless network, where the backhaul SI is different from access SI used by one or more wireless devices to access a cell supported by the relay device, and accessing the network node or the other network node based on the backhaul SI, the access SI, or both.

An apparatus for wireless communications is described. The apparatus may include a processor, memory in electronic communication with the processor, and instructions stored in the memory. The instructions may be executable by the processor to cause the apparatus to receive, at a relay device in a wireless network, a backhaul SI configuration from a network node in the wireless network, determine, based on the backhaul SI configuration, backhaul SI for communication with the network node or another network node of the wireless network, where the backhaul SI is different from access SI used by one or more wireless devices to access a cell supported by the relay device, and access the network node or the other network node based on the backhaul SI, the access SI, or both.

Another apparatus for wireless communications is described. The apparatus may include means for receiving, at a relay device in a wireless network, a backhaul SI configuration from a network node in the wireless network, determining, based on the backhaul SI configuration, backhaul SI for communication with the network node or another network node of the wireless network, where the backhaul SI is different from access SI used by one or more wireless devices to access a cell supported by the relay device, and accessing the network node or the other network node based on the backhaul SI, the access SI, or both.

A non-transitory computer-readable medium storing code for wireless communications is described. The code may include instructions executable by a processor to receive, at a relay device in a wireless network, a backhaul SI configuration from a network node in the wireless network, determine, based on the backhaul SI configuration, backhaul SI for communication with the network node or another network node of the wireless network, where the backhaul SI is different from access SI used by one or more wireless devices to access a cell supported by the relay device, and access the network node or the other network node based on the backhaul SI, the access SI, or both.

In some examples of the method, apparatuses, and non-transitory computer-readable medium described herein, determining the backhaul SI may include operations, features, means, or instructions for monitoring a backhaul search space and a backhaul control resource set (CORESET) indicated by the backhaul SI configuration for a backhaul-specific SI radio network temporary identifier (SI-RNTI).

In some examples of the method, apparatuses, and non-transitory computer-readable medium described herein, the backhaul SI configuration indicates one or both of a search space and CORESET for an SI grant.

Some examples of the method, apparatuses, and non-transitory computer-readable medium described herein may further include operations, features, means, or instructions for receiving, based on the backhaul SI configuration, a PDCCH conveying the SI grant, where the SI grant schedules an SI message via PDSCH.

Some examples of the method, apparatuses, and non-transitory computer-readable medium described herein may further include operations, features, means, or instructions for receiving, at the relay device, a synchronization signal (SS) that indicates the access SI.

Some examples of the method, apparatuses, and non-transitory computer-readable medium described herein may further include operations, features, means, or instructions for receiving, at the relay device, an access SI configuration that indicates an access search space and an access CORESET and monitoring the access search space and the access CORESET for an access-specific SI-RNTI.

In some examples of the method, apparatuses, and non-transitory computer-readable medium described herein, the access-specific SI-RNTI and the backhaul-specific SI-RNTI may be different.

In some examples of the method, apparatuses, and non-transitory computer-readable medium described herein, at least a portion of the backhaul search space may be the same as at least a portion of the access search space.

In some examples of the method, apparatuses, and non-transitory computer-readable medium described herein, at least a portion of the backhaul CORESET may be the same as at least a portion of the access CORESET.

In some examples of the method, apparatuses, and non-transitory computer-readable medium described herein, the access SI configuration indicates one or both of a search space and CORESET for an SI grant.

Some examples of the method, apparatuses, and non-transitory computer-readable medium described herein may further include operations, features, means, or instructions for receiving, based on the access SI configuration, a PDCCH conveying the SI grant, where the SI grant schedules an SI message via PDSCH.

In some examples of the method, apparatuses, and non-transitory computer-readable medium described herein, receiving the PDCCH may include operations, features, means, or instructions for descrambling one or more CRC bits using the access SI-RNTI.

Some examples of the method, apparatuses, and non-transitory computer-readable medium described herein may further include operations, features, means, or instructions for transmitting, to the network node or another network node, a first random access message based on the backhaul SI.

Some examples of the method, apparatuses, and non-transitory computer-readable medium described herein may further include operations, features, means, or instructions for determining that a random access procedure was unsuccessful based on transmitting the first random access message and transmitting, to the network node or the other network node, a second random access message based on the access SI.

Some examples of the method, apparatuses, and non-transitory computer-readable medium described herein may further include operations, features, means, or instructions for receiving, at the relay device, an access SI configuration from the network node in the wireless network, determining, based on the access SI configuration, access SI for one or more wireless devices to access the cell supported by the relay device and transmitting a SS that indicates the access SI to one or more devices in the wireless network.

In some examples of the method, apparatuses, and non-transitory computer-readable medium described herein, the backhaul SI includes a backhaul-specific SI-RNTI, an access-specific SI-RNTI for the access SI, or a combination thereof.

In some examples of the method, apparatuses, and non-transitory computer-readable medium described herein, the backhaul SI includes a CORESET or a search space different from the access SI.

Some examples of the method, apparatuses, and non-transitory computer-readable medium described herein may further include operations, features, means, or instructions for receiving a broadcast channel from the network node that includes a common MIB, determining a backhaul CORESET or a backhaul search space for communications with the network node based on the common MIB and monitoring the backhaul CORESET or the backhaul search space for a backhaul-specific SI-RNTI.

Some examples of the method, apparatuses, and non-transitory computer-readable medium described herein may further include operations, features, means, or instructions for determining an access CORESET or an access search space based on the common MIB, where the access CORESET may be different from the backhaul CORESET or the access search space may be different from the backhaul search space and transmitting a SS that indicates the access SI to one or more devices in the wireless network based on the access CORESET or the access search space.

Some examples of the method, apparatuses, and non-transitory computer-readable medium described herein may further include operations, features, means, or instructions for determining the backhaul CORESET or the backhaul search space based on a backhaul-specific relationship table that maps the common MIB to the backhaul CORESET or the backhaul search space and determining the access CORESET or the access search space based on an access-specific relationship table that maps the common MIB to the access CORESET or the access search space.

Some examples of the method, apparatuses, and non-transitory computer-readable medium described herein may further include operations, features, means, or instructions for determining an access CORESET or an access search space based on the common MIB, where the access CORESET may be different from the backhaul CORESET or the access search space may be different from the backhaul search space and receiving a SS that indicates the access SI to one or more devices in the wireless network based on the access CORESET or the access search space.

Some examples of the method, apparatuses, and non-transitory computer-readable medium described herein may further include operations, features, means, or instructions for receiving access remaining minimum SI (RMSI) using a first set of transmission beams and receiving backhaul RMSI using a second set of transmission beams, where at least one transmission beam of the second set of transmission beams may be in a different direction than at least one transmission beam of the first set of transmission beams.

Some examples of the method, apparatuses, and non-transitory computer-readable medium described herein may further include operations, features, means, or instructions for transmitting access RMSI using a first set of transmission beams and transmitting backhaul RMSI using a second set of transmission beams, where at least one transmission beam of the second set of transmission beams may be in a different direction than at least one transmission beam of the first set of transmission beams.

Some examples of the method, apparatuses, and non-transitory computer-readable medium described herein may further include operations, features, means, or instructions for monitoring a search space indicated by the access SI for an access-specific radio network temporary identifier (RNTI).

Some examples of the method, apparatuses, and non-transitory computer-readable medium described herein may further include operations, features, means, or instructions for scrambling DCI based on an access-specific RNTI and transmitting the scrambled DCI to one or more devices in the wireless network.

Some examples of the method, apparatuses, and non-transitory computer-readable medium described herein may further include operations, features, means, or instructions for generating a demodulation reference signal (DMRS) based on an access-specific RNTI and transmitting the DMRS to one or more devices in the wireless network.

In some examples of the method, apparatuses, and non-transitory computer-readable medium described herein, the DMRS may be associated with a PDCCH or a PDSCH.

Some examples of the method, apparatuses, and non-transitory computer-readable medium described herein may further include operations, features, means, or instructions for generating a PDSCH based on an access-specific RNTI and transmitting the PDSCH to one or more devices in the wireless network.

Some examples of the method, apparatuses, and non-transitory computer-readable medium described herein may further include operations, features, means, or instructions for receiving, from the network node, DCI and descrambling the DCI based on an access-specific RNTI.

Some examples of the method, apparatuses, and non-transitory computer-readable medium described herein may further include operations, features, means, or instructions for receiving, from the network node, a DMRS based on an access-specific RNTI.

In some examples of the method, apparatuses, and non-transitory computer-readable medium described herein, the DMRS may be associated with a PDCCH or a PDSCH.

Some examples of the method, apparatuses, and non-transitory computer-readable medium described herein may further include operations, features, means, or instructions for receiving, from the network node, a PDSCH based on an access-specific RNTI.

In some examples of the method, apparatuses, and non-transitory computer-readable medium described herein, a content of RMSI for one or more reference signals (RSs) may be backhaul specific, where the one or more RSs include a SS block or a CSI RS.

In some examples of the method, apparatuses, and non-transitory computer-readable medium described herein, the RSs may be associated with different transmission beam directions.

In some examples of the method, apparatuses, and non-transitory computer-readable medium described herein, a content of backhaul-specific RMSI for a first RSs may be different from the content of backhaul-specific RMSI for a second RS that may be different from the first RS.

A method of wireless communications is described. The method may include receiving, at a relay device in a wireless network, an access SI configuration and a backhaul SI configuration from a network node in the wireless network, determining, based on the access SI configuration, access SI for one or more devices to access a cell supported by the relay device, where the access SI is different from backhaul SI used for communication with the network node or another network node of the wireless network, and transmitting a SS that indicates the access SI to the one or more devices in the wireless network.

An apparatus for wireless communications is described. The apparatus may include a processor, memory in electronic communication with the processor, and instructions stored in the memory. The instructions may be executable by the processor to cause the apparatus to receive, at a relay device in a wireless network, an access SI configuration and a backhaul SI configuration from a network node in the wireless network, determine, based on the access SI configuration, access SI for one or more devices to access a cell supported by the relay device, where the access SI is different from backhaul SI used for communication with the network node or another network node of the wireless network, and transmit a SS that indicates the access SI to the one or more devices in the wireless network.

Another apparatus for wireless communications is described. The apparatus may include means for receiving, at a relay device in a wireless network, an access SI configuration and a backhaul SI configuration from a network node in the wireless network, determining, based on the access SI configuration, access SI for one or more devices to access a cell supported by the relay device, where the access SI is different from backhaul SI used for communication with the network node or another network node of the wireless network, and transmitting a SS that indicates the access SI to the one or more devices in the wireless network.

A non-transitory computer-readable medium storing code for wireless communications is described. The code may include instructions executable by a processor to receive, at a relay device in a wireless network, an access SI configuration and a backhaul SI configuration from a network node in the wireless network, determine, based on the access SI configuration, access SI for one or more devices to access a cell supported by the relay device, where the access SI is different from backhaul SI used for communication with the network node or another network node of the wireless network, and transmit a SS that indicates the access SI to the one or more devices in the wireless network.

Some examples of the method, apparatuses, and non-transitory computer-readable medium described herein may further include operations, features, means, or instructions for transmitting, to the one or more devices, an access SI configuration that indicates an access search space and an access CORESET.

Some examples of the method, apparatuses, and non-transitory computer-readable medium described herein may further include operations, features, means, or instructions for transmitting, based on the access SI configuration, a PDCCH conveying the SI grant, where the SI grant schedules an SI message via PDSCH.

In some examples of the method, apparatuses, and non-transitory computer-readable medium described herein, transmitting the PDCCH may include operations, features, means, or instructions for scrambling one or more CRC bits using the access SI-RNTI.

Some examples of the method, apparatuses, and non-transitory computer-readable medium described herein may further include operations, features, means, or instructions for scrambling DCI based on an access-specific RNTI and transmitting the scrambled DCI to the one or more devices in the wireless network.

Some examples of the method, apparatuses, and non-transitory computer-readable medium described herein may further include operations, features, means, or instructions for generating a DMRS based on an access-specific RNTI and transmitting the DMRS to the one or more devices in the wireless network.

Some examples of the method, apparatuses, and non-transitory computer-readable medium described herein may further include operations, features, means, or instructions for generating a PDSCH based on an access-specific RNTI and transmitting the PDSCH to the one or more devices in the wireless network.

DETAILED DESCRIPTION

Some wireless communications systems, such as those deploying New Radio (NR) technologies, may include access nodes (ANs) to facilitate wireless communication between a user equipment (UE) and a network. In some cases, an anchor AN, or an integrated access backhaul (IAB) donor node, may have a high-capacity, wired, backhaul connection (e.g., fiber) to the network, while communicating simultaneously with one or more ANs (e.g., relay devices) or UEs. A network that supports communications between an AN and a UE may be referred to as an access network, while a network that supports communications between one or more ANs may be referred to as a backhaul network. In deployments supporting both access and backhaul (e.g., in an IAB network), standard access communication configurations may be constrictive in backhaul communications.

Generally, the described techniques provide for system information (SI) configurations that are specific to either access or backhaul procedures. In some cases, an AN may send random access channel (RACH) configuration information to devices within its cell. The separate SI for access and backhaul procedures may indicate different configurations for RACH procedures depending on whether the procedure is associated with backhaul or access. A receiving AN may indicate SI to the devices in a cell via a common master information block (MIB). The MIB may direct devices to a search space allowing them to receive additional (e.g., remaining) SI. The search space may be the same search space for both access and backhaul, or alternatively, the common MIB may direct devices to separate search spaces for access and backhaul procedures. The receiving AN may indicate the remaining SI to the devices which is specific to either backhaul or access procedures. For a RACH procedure, the separate SI for backhaul and access procedures may enable a receiving AN to receive and/or transmit RACH preambles for both access and backhaul procedures.

Aspects of the disclosure are initially described in the context of wireless communications systems. Aspects of the disclosure are then illustrated and described with reference to a process flow. Aspects of the disclosure are further illustrated by and described with reference to apparatus diagrams, system diagrams, and flowcharts that relate to system information for access and backhaul.

Figure 1:
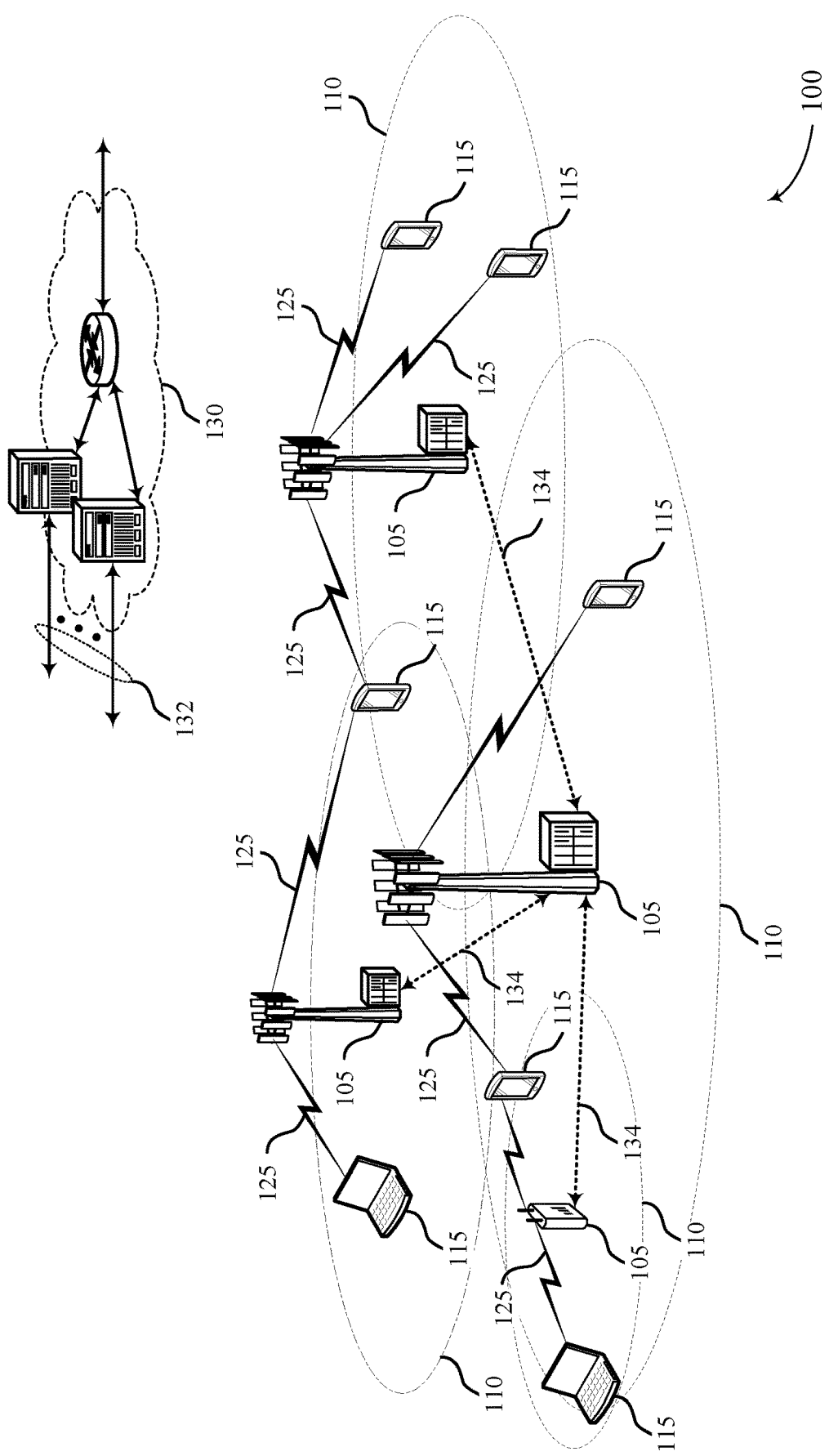
FIGS. 1 through 4 illustrate examples of wireless communications systems that support system information (SI) for access and backhaul in accordance with aspects of the present disclosure.

FIG. 1 illustrates an example of a wireless communications system 100 that supports system information for access and backhaul in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, a distribution unit (DU), a central unit (CU), or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, DUs, CUs, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. For example, a UE 115 may be referred to as a mobile terminal (MT). A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread orthogonal frequency division multiplexing (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may include ANs, which may be implemented or supported by a base station 105 or a UE 115 that supports AN functionality (ANF)) to facilitate wireless communication between a UE 115 and the network (e.g., a node of the core network 130). In some cases, an anchor AN may have a high-capacity, wired, backhaul connection (e.g., fiber) to the network, while communicating simultaneously with one or more ANs (e.g., relay devices) or UEs 115. A network that supports communications between an AN and a UE 115 may be referred to as an access network, while a network that supports communications between one or more ANs may be referred to as a backhaul network.

In deployments supporting both access and backhaul (e.g., in an IAB network), wireless communications system 100 may support access-specific SI and backhaul-specific SI. As described herein, SI may refer to any combination of remaining minimum SI (RMSI) and other SI (OSI). Accordingly, backhaul SI, which may include backhaul RMSI and backhaul OSI, may be different from access SI, which may include access RMSI and access OSI. Further, SI radio network temporary identifiers (SI-RNTIs), which may be used to scramble contents of downlink messages or generate reference signals, may be different for access and backhaul. The access-specific and backhaul-specific SI may be used to configure a RACH procedure depending on whether the RACH procedure is for access or backhaul.

Figure 2:
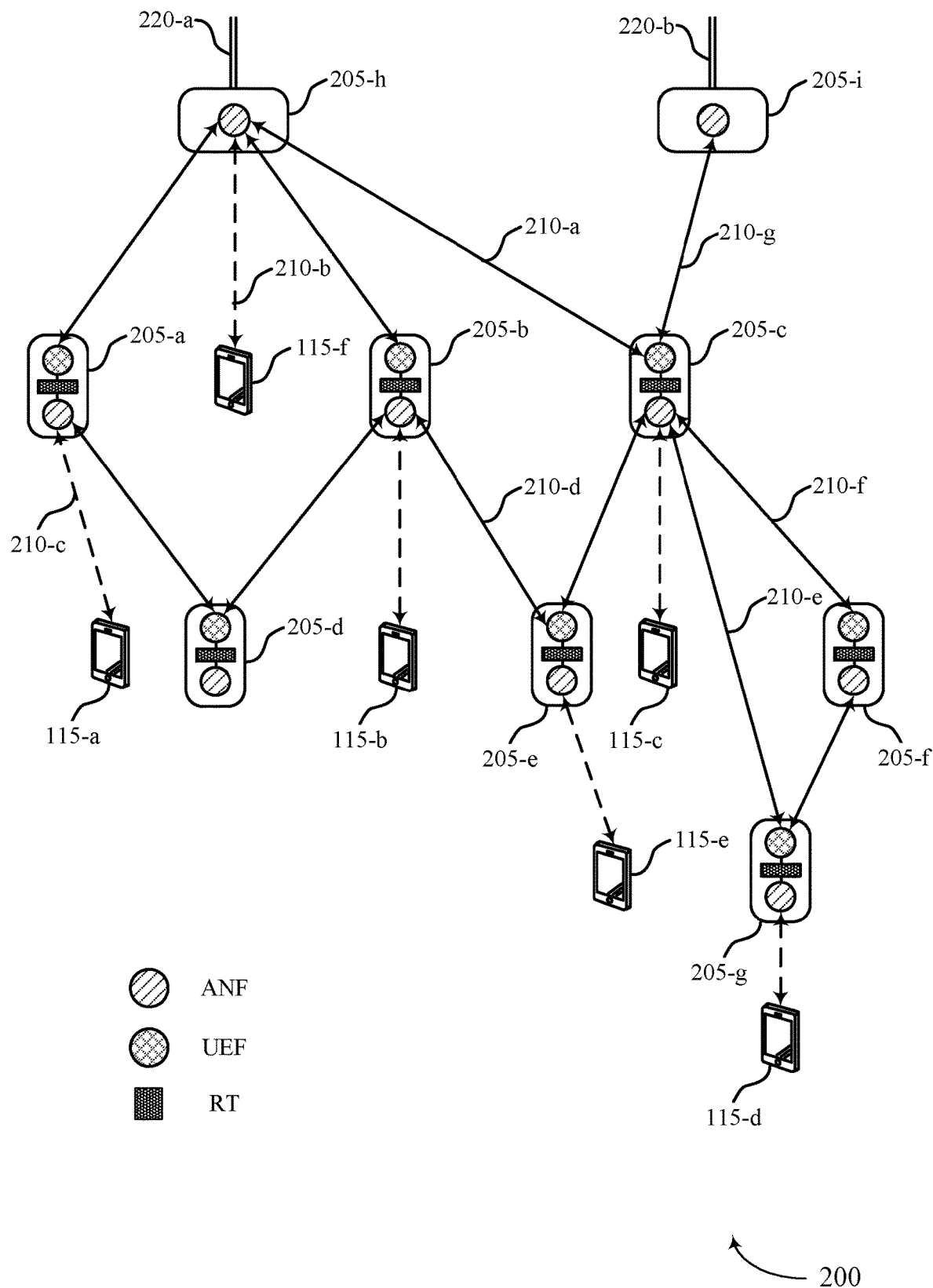

FIG. 2 illustrates an example of a wireless communications system 200 that supports SI for access and backhaul in accordance with aspects of the present disclosure. In some examples, wireless communications system 200 may implement aspects of wireless communications system 100. In some cases, the wireless communications system 200 may be an example of a wireless communications network that operates in mmW spectrum, or supports 5G NR deployments. The wireless communications system 200 may include a number of ANs 205 (ANs 205-*a*, 205-*b*, 205-*c*, etc.) and UEs 115 that communicate over a combination of wired links 220 (e.g., wired links 220-*a* and 220-*b*) and wireless links 210. In some cases, the wired links 220 may be core network links, and may connect anchor ANs 205-*h* and 205-*i* to the core network (e.g., core network 130 of FIG. 1). The ANs 205 may be examples of the ANs (e.g., relay devices, base stations 105, DUs, CUs) described in reference to FIG. 1. The UEs 115 may be examples of the UEs (e.g., mobile terminals, mobile devices) described in reference to FIG. 1.

In some examples, complex backhaul topologies may be handled by composing the topology from multiple stars that mutually overlap. For instance, wireless communications system 200 may include a mesh topology with at least two interfaces to a wireline network. Additional ANs 205 may be either directly or indirectly coupled to the respective interfaces of the mesh topology via wireless links 210 (e.g., wireless link 210-*a*). Such a topology may include multiple stars, where some stars mutually overlap. An access node function (ANF) may be supported by an AN 205 of the mesh topology (e.g., ANs 205-*b*, 205-*h*, 205-*i*, etc.). UE functions (UEF) may be configured at some or all of the ANs 205 of the wireless communications system 200. As a result, an AN 205 may include support multiple AN functions (ANFs) and UEFs configured for uplink and downlink data packet transmission according to an active mode or a suspended mode using the node functions.

In some cases, each of the one or more wireless links 210 may be associated with wireless resources of a RAT, establishing resource functionality for access and backhaul traffic within the mesh topology. For example, AN 205-*b* may include one or more instances of a UEF, where it may communicate with the ANFs at ANs 205-*h*, 205-*d*, and 205-*e*. In some cases, ANs 205 may each communicate with each other using at least one ANF and at least one UEF, and may form overlapping stars. Wireless links may be associated with different sets of resources, where the resources are cooperatively allocated according to a schedule established by the ANFs. Multiple stars may use techniques to coordinate wireless resources, which may efficiently handle system constraints such as half-duplexed communications, inter-link interference, etc. For instance, inter-link interference may be managed using spatial division multiple access (SDMA) techniques (e.g., through the use of narrow beams), and inter-node beam coordination may account for any remaining interference. In some examples, an AN 205 may also include a routing table (RT), which may be used in the determination of a location for packets to be directed. Each AN 205 may further include a relay functionality, where a given AN 205 may relay transmissions between ANs 205, for example, from a UE 115 to another AN 205, such as AN 205-*e* supporting communication between the network and UE 115-*e* via AN 205-*b*.

Additionally or alternatively, mobile access may be integrated at one or more ANs 205 of the wireless communications system 200. Each AN 205 of the integrated mobile access may be configured to form a star topology with UEs 115. For example, AN 205-*a* may correspond to a center of a star topology of integrated mobile access within the network. One or more UEs 115-*a* may be coupled to AN 205-*a* via one or more wireless links (e.g., wireless link 210-*c*). In some examples, mobile access links may also be added to existing stars. In an example, AN 205-*c* may communicate with AN 205-*h* using wireless link 210-*a*. AN 205-*g* may further communicate with UE 115-*d* and AN 205-*c* over wireless links 210 (e.g., wireless link 210-*e*). In this example, wireless links 210-*a* and 210-*e* both share the same set of wireless resources to provide support for IAB. In some cases, a range of ANF and UEF combinations may be instantiated in an AN 205. Additional or different combinations of UEF and ANF instances in ANs 205, as well as different topologies not shown in FIG. 2, may be possible.

In an IAB network, synchronization may be desired between various ANs 205 within the IAB. Synchronization may improve various aspects of the IAB, for example handover procedures. In order to achieve IAB network synchronization, there may be inter-relay discovery between ANs 205 in an IAB. In some cases, an AN 205 within an IAB network may perform a RACH procedure with another AN 205 in the IAB network as part of inter-relay discovery. The RACH procedure configuration may be specified by the receiving AN 205 via inter-relay SI.

For example, AN 205-*e* may perform a backhaul RACH procedure with AN 205-*b* via wireless link 210-*d*. The RACH procedure may include AN 205-*e* transmitting a RACH preamble to AN 205-*b* in order to establish a connection (e.g., with the network via anchor AN 205-*h* and AN 205-*b* serving as a relay). AN 205-*e* may transmit the RACH preamble to AN 205-*b* based on a backhaul RACH configuration. AN 205-*b* may receive the RACH preamble from AN 205-*e* and transmit a random access response, thus allowing AN 205-*e* to establish the connection with AN 205-*b*.

In another example, UE 115-*b* may perform an access RACH procedure with AN 205-*b*. The RACH procedure may include UE 115-*b* transmitting a RACH preamble to AN 205-*b* in order to establish a connection with AN 205-*b*. UE 115-*b* may transmit the RACH preamble according to an access RACH configuration. In some cases, the access RACH configuration governing the RACH preamble transmission from UE 115-*b* may be a different configuration from the backhaul RACH configuration governing the RACH preamble transmission of AN 205-*e* to AN 205-*b*. For example, UE 115-*b* may transmit RACH preamble to AN 205-*b* on different time or frequency resources than AN 205-*e* uses to transmit a RACH preamble to AN 205-*b*. In some cases, upon receiving the RACH preamble from UE 115-*b*, AN 205-*b* may transmit a random access response to UE 115-*b*. The random access response may enable UE 115-*b* to establish a connection with AN 205-*b*.

Figure 3:
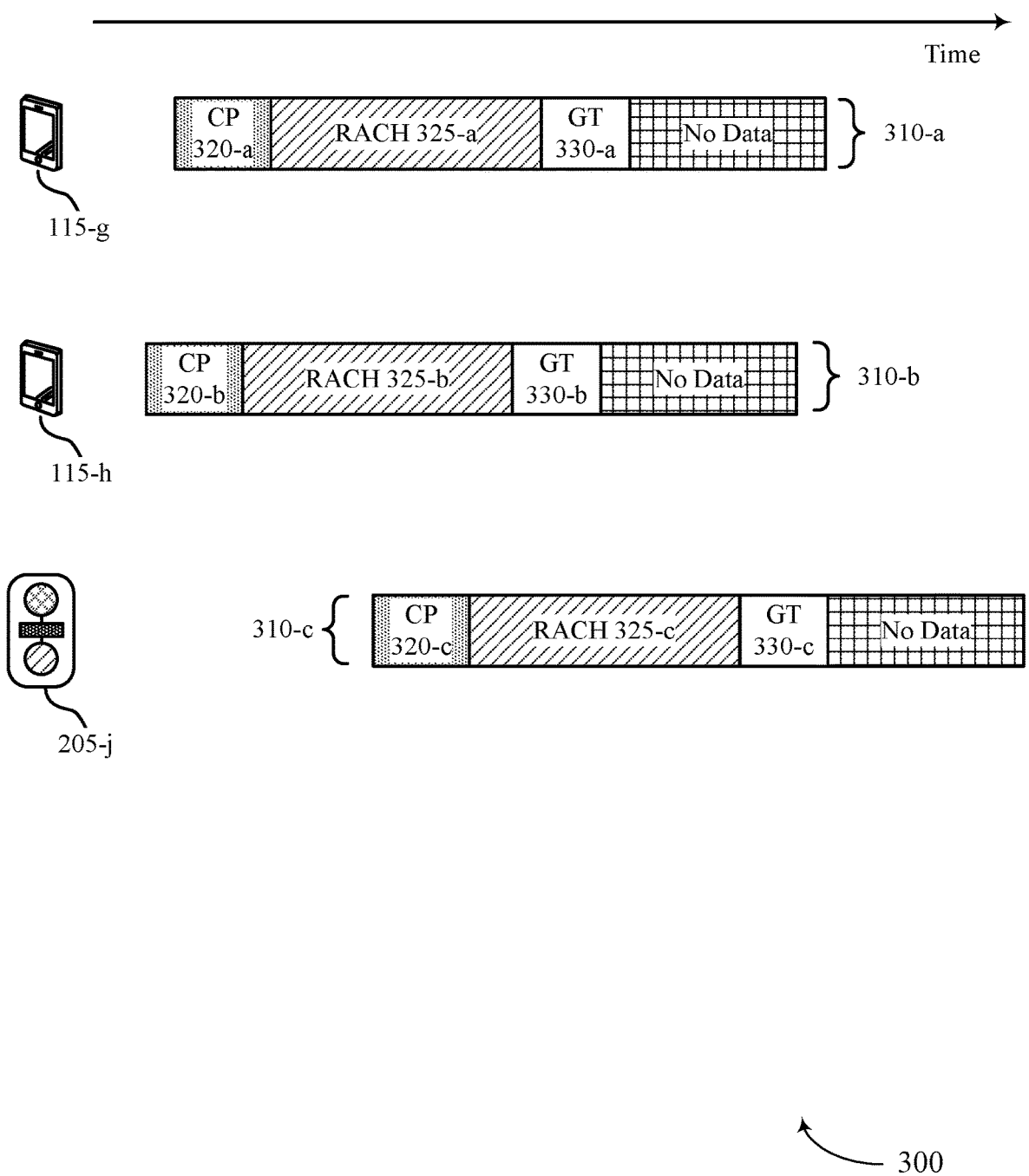

FIG. 3 illustrates an example of a RACH procedure 300 that supports SI for access and backhaul in accordance with aspects of the present disclosure. In some examples, RACH procedure 300 may implement aspects of wireless communications systems 100 and/or 200 and may be an example of a wireless communications network that operates in mmW spectrum. The RACH procedure 300 may be implemented by a number of UEs 115 and ANs 205-*j* that communicate over a combination of wired and wireless links. The UEs 115 may be examples of UEs 115 as described in reference to FIGS. 1 and 2. The ANs 205-*j* may be examples of ANs 205 as described in reference to FIG. 2.

In some cases, UEs 115 and AN 205-*j* may send a RACH preamble 310 to another wireless device, for example a relay device (e.g., a base station, an AN, a UE supporting ANF), as described herein. Time and frequency resources may be reserved for the RACH preamble transmissions, which may be configured according to SI transmitted to each of the UEs 115 and AN 205-*j* (e.g., from the relay device or another wireless device). In some examples, SI for performing backhaul RACH procedures may be different than the SI used for performing access RACH procedures.

RACH preambles 310 may have various formats. For example, a RACH preamble 310 may be either a short format or a long format, where each supports different cell sizes. RACH preambles 310 may also include a cyclic prefix (CP) 320, a payload (e.g., a RACH Msg1 325), a guard time (GT) 330, and/or additional unused resources (e.g., resources during which no data transmissions occur). The CP 320 and GT 330 may be used to avoid interference with the previous and next subframes, and may be related to the size of the cell radius. In some cases, a large CP 320 and GT 330 may correspond to a larger cell radius.

During a designated set of time resources, which may be indicated in SI, multiple devices may transmit RACH preambles to a relay device. For example, UEs 115 may be transmitting RACH preambles 310 as part of an access RACH procedure, while AN 205-*j* may be transmitting a RACH preamble 310-*c* as part of a backhaul RACH procedure. That is, AN 205-*j* may be transmitting according to UEF in order to access another AN, while UEs 115 may be transmitting according to UEF in order to access the relay device.

However, a round-trip-time (RTT) for RACH messages of a backhaul RACH procedure (e.g., from AN 205-*j*) may be relatively large compared to RTTs for RACH messages of an access RACH procedure (e.g., from UE 115-*g* or UE 115-*h*). The different RTTs may be due to access RACH procedures occurring within a single cell while backhaul RACH procedures occur between cells, which may result in a larger distance between devices. In some examples, the RTTs for a backhaul RACH procedure may be 2, 3, 4, or 5 times as long as the RTT for an access procedure. Further, the received power at a relay device for backhaul RACH messages may exceed the received power for access RACH communications.

The relay device may configure the RACH preambles to account for differences in access RACH and backhaul RACH communications. In some cases, UEs 115 and AN 205-*j* may use a short format versus a long format to compensate for differing RTTs and link budgets. A relay device may also support multiplexing multiple RACH preambles 310 (e.g., from UEs 115 and AN 205-*j*). For example, a relay device may multiplex RACH preamble 310-*b* from UE 115-*g* on the same symbol as RACH preamble 310-*c* from AN 205-*j*. Further, the relay device may utilize open-loop power control in order to equalize the receiving power at the relay device from UEs 115 and AN 205-*j*.

In some cases, differing RTTs may cause RACH preambles 310 from different devices to be received by a relay device at different times, although the time allotted for transmission of the RACH preamble may be the same for the devices transmitting the RACH preambles 310. For instance, UE 115-*g* may have an RTT associated with its communications with a relay device configured for ANF. The RTT length may determine when the relay device receives RACH preamble 310-*a*. UE 115-*h* may also have an RTT associated with its communications with the relay device. In some cases, the RTT for communications between UE 115-*h* and the relay device may be smaller than the RTT associated with the communications between UE 115-*g* and the relay device. That is, the relay device may receive RACH preamble 310-*b* from UE 115-*h* prior to receiving RACH preamble 310-*a* from UE 115-*g* (e.g., due to UE 115-*h* being closer to the relay device than UE 115-*g*).

In some cases, the RTT associated with the communications between AN 205-*j* and the relay device may be larger than the RTTs associated with communications between UEs 115 and the relay device (e.g., due to AN 205-*j* being farther from the relay device compared to the UEs 115). The difference in RTTs may cause the relay device to receive RACH preamble 310-*c* later than RACH preambles 310-*a* and 310-*b*. To accommodate for this difference in reception time, the relay device may use receiver algorithms to support RACH preamble detection for a larger range of RTTs, which may allow the relay device to detect both access RACH preambles 310-*a* and 310-*b* as well as backhaul RACH preambles 310-*c*. For example, backhaul RACH procedures may utilize a longer CP 320-*c* and larger CS values. Alternatively, the relay device may not utilize any CS during a backhaul RACH procedure. In another example, the relay device may avoid scheduling any transmissions after backhaul RACH procedures. This may account for larger RTTs as the relay device may receive backhaul RACH preamble 310-*c* later than access preambles 310-*a* and 310-*b*. By not scheduling transmissions directly after RACH procedures, any backhaul RACH preambles 310-*c* received at a later time may still be detected by the relay device.

In some cases, backhaul RACH preamble 310-*c* may have a large link budget, which may result in AN 205-*j* transmitting a shorter preamble. Further, AN 205-*j* may send backhaul RACH preamble 310-*c* with a higher transmission power than UEs 115 send preambles 310-*a* and 310-*b*. The higher transmission power may allow for a higher probability of a successful reception even in the case of a shorter RACH preamble 310-*c* transmission duration.

Figure 4:
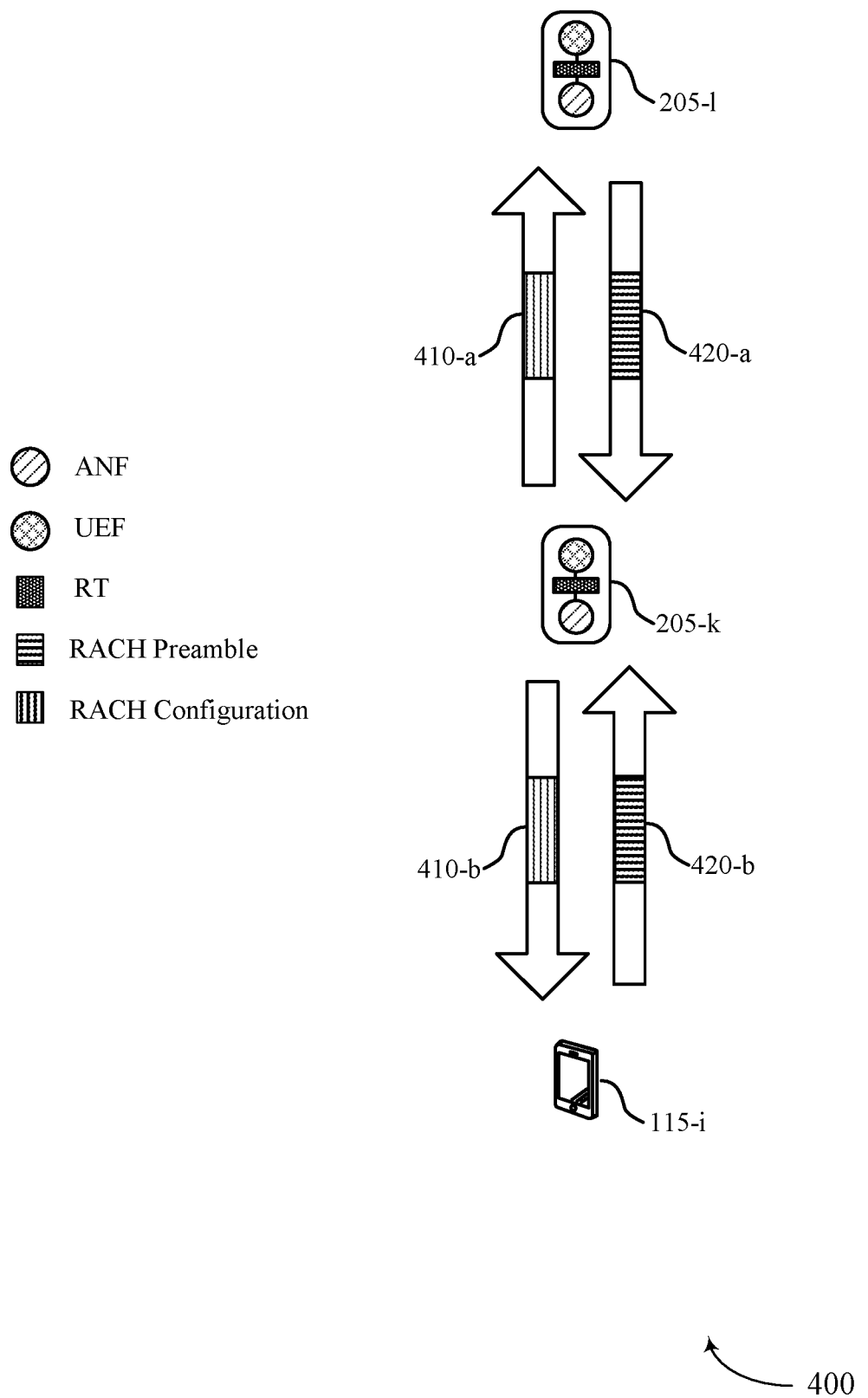

FIG. 4 illustrates an example of a wireless communications system 400 that supports SI for access and backhaul in accordance with aspects of the present disclosure. In some examples, wireless communications system 400 may implement aspects of wireless communications systems 100 or 200 and may be an example of a wireless communications network that operates in mmW spectrum. The wireless communications system 400 may include a number of UE 115-*i* and ANs 205 that communicate over a combination of wired and wireless links.

Receiving AN 205-*k* may be communicating with AN 205-*l* and UE 115-*i* via downlink channels 410 and uplink channels 420. Receiving AN 205-*k* may transmit SI to AN 205-*l* and UE 115-*i*. AN 205-*k* may transmit SI via MIBs, RMSI, OSI, or a combination thereof. A MIB may include several SIBs transmitted via a non-scheduled physical broadcast channel (PBCH). Receiving AN 205-*k* may transmit the PBCH periodically within synchronization signals (SSs). For example, AN 205-*k* may broadcast, via an SS block in downlink channels 410, a MIB. The MIB may be shared across the entire cell, such that AN 205-*l* and UE 115-*i* share the information contained in the MIB. In some cases, the MIB may indicate, to the devices in the cell (i.e., AN 205-*l* and UE 115-*i*), a search space or control resource set (CORESET), for RACH procedures. The devices in the cell may monitor the search space indicated in the MIB. Receiving AN 205-*k* may indicate an SI-RNTI in the search space. The devices in the cell (i.e., AN 205-*l* and UE 115-*i*) may use a RNTI to descramble downlink control information (DCI), sent via a physical downlink control channel (PDCCH) in downlink channels 410, from receiving AN 205-*k*. For example, the device may use an RNTI to descramble some CRC bits of a PDCCH. The DCI may specify the timing and frequency resources that AN 205-*k* may transmit additional SI (i.e., RMSI, SIB). In some examples, RMSI may be transmitted via scheduled transmissions on the PDSCH. In some cases, a demodulation reference signal (DMRS) may be associated with a PDCCH or PDSCH. The DMRS may be based on an access-specific RNTI. AN 205-*l* and UE 115-*i* may receive SI from AN 205-*k*. The SI may contain configuration information for future transmissions, such as transmissions occurring in relation to a RACH procedure. In some cases, the SI transmitted via downlink channel 410 may indicate to AN 205-*l* and UE 115-*i* the time and/or frequency resources to utilize for RACH preambles, as transmitted via uplink channels 420.

In some cases, receiving AN 205-*k* may configure RACH procedures differently for backhaul RACH with AN 205-*l* and access RACH with UE 115-*i*. Receiving AN 205-*k* may indicate the backhaul-specific RACH configurations using backhaul RMSI via channel 410-*a*. In some cases, the backhaul-specific RACH configurations may include distinct time-frequency resources for RACH preambles. For instance, an accessing device, such as UE 115-*i*, may use different time and/or frequency resources to transmit access RACH preamble via uplink channel 420-*b* than an ANF AN, such as AN 205-*l*, may use to transmit backhaul RACH preamble via uplink channel 420-*a*. The distinct time and frequency resource configuration may allow receiving AN 205-*k* to receive RACH preambles from both ANF devices (such as 205-*k*) and UEF devices (such as UE 115-*i*) despite differences between the RACH preambles (e.g., RTTs, power).

In some cases, there may be backhaul-specific SI and access-specific SI. For example, a common MIB may indicate to the devices in the cell (i.e., AN 205-*l* and UE 115-*i*) a separate search space, or CORESET, for access RACH and backhaul RACH procedures. In some cases, the common MIB may be mapped to backhaul SI and access SI separately according to respective relationship tables. For example, the AN 205-*l* may map the common MIB to backhaul SI (e.g., backhaul search space, backhaul CORESET) according to a first relationship table (e.g., a backhaul-specific relationship table). UE 115-*i* may map the common MIB to access SI (e.g., access search space, access CORESET) according to a second relationship table (e.g., an access-specific relationship table). In some aspects, the mapping of the common MIB to backhaul SI may be different than the mapping of the common MIB to access SI and thus, the first and second relationship tables may be different. This may result in AN 205-*l* may interpret the common MIB differently than UE 115-*i*. In some cases, UE 115-*i* may only monitor the access search space while AN 205-*l* may monitor both the access search space and the backhaul search space. AN 205-*l* may have both ANF and UEF and therefore may require both access and backhaul SI. Receiving AN 205-*k* may indicate an SI-RNTI within each search space, where the SI-RNTI may be unique for access and backhaul.

In the case that AN 205-*l* is a relay node configured with both ANF and UEF, AN 205-*l* may have distinct RMSI for backhaul that is different from an RMSI for access. In some cases, receiving AN 205-*k* may transmit an indication of a backhaul RMSI and access RMSI via the same frequency and time resources in channel 410-*a*. For example, AN 205-*l* may use the same search space, or CORESET, to receive both backhaul RMSI and access RMSI via downlink channel 410-*a*. Alternatively, AN 205-*l* may use different time and/or frequency resources for backhaul RMSI and access RMSI. For example, AN 205-*k* may transmit a common MIB via downlink channel 410-*a* for both backhaul and access RMSI, but AN 205-*l* may interpret the frequency bits within the MIB differently for backhaul and access RMSI. This may be due to a separate CORESET, or search space, for backhaul SI and access SI. For example, there may be four bits within MIB indicating the frequency resources for RMSI. AN 205-*l* may refer to a first look-up table to determine a set of frequency resources that may be used for access RMSI. AN 205-*l* may then use the same four bits but a different look-up table to determine a different set of frequency resources that may be used for backhaul RMSI.

In some examples, additional information elements (IEs) may be utilized for RMSI beyond the IEs reserved for access RMSI. For example, receiving AN 205-*k* may transmit both access and backhaul RMSI via downlink channel 410-*a* to AN 205-*l*. In some instances, AN 205-*k* may use additional IEs dedicated to RMSI. For example, AN 205-*k* may utilize IEs reserved for RMSI to transmit both access RMSI and backhaul RMSI.

In some cases, RMSI may be beam-specific. For instance, receiving AN 205-*k* may utilize a set of beams for backhaul RMSI transmissions and a second set of beams for access RMSI, which may have different beams. Receiving AN-205-*k* may use certain high angle beams for backhaul-RMSI and low angle beams for access RMSI. In other cases, the sets may share one or more beams or each beam may have an associated RS. That is, each beam which is associated with either backhaul, access, or both, may contain RSs that include SS blocks and a channel state information (CSI) RS.

In some cases, accessing device (UE 115-*i*) may only search for access RMSI. For example, backhaul AN 205-*l* may be configured with both ANF and UEF and may search for both backhaul and access RMSI. However, access AN 115-*i* configured with only UEF may only search for access RMSI. Receiving AN 205-*k* may not indicate the presence of RMSI to accessing AN 115-*i* if there is only backhaul RMSI. In such a case, accessing AN 115-*i* may not search for any RMSI.

A device in a cell (i.e. AN 205-*l* or UE 115-*i*) may transmit a RACH preamble via channel 420 to receiving AN 205-*k* according to the SI configurations. In some cases, the backhaul RACH preamble transmitted via 420-*a* by AN 205-*l* may be configured differently than the access RACH preamble transmitted via 420-*b* by UE 115-*i*. For example, the backhaul RACH preamble and access RACH preamble may have different resource allocations, timing guidelines, formats, etc. In some cases, the AN 205-*l* may transmit the RACH preamble according the a backhaul configuration and determine the transmission was unsuccessful. The determination may be based on not receiving a response, receiving a negative acknowledgment response, or other factors. Having determined the first transmission of the RACH preamble was unsuccessful, AN 205-*l* may retransmit the RACH preamble according to access configuration.

In some cases, relay device AN 205-*l* may receive both access and backhaul RACH configurations from receiving AN 205-*k*. In this case, AN 205-*l* may utilize the backhaul RACH configurations for a RACH procedure with AN 205-*k*. AN 205-*l* may utilize the access RACH configurations for communications with other devices in its cell. For example, AN 205-*l* may receive the access RACH configurations and transmit SI according to the received access RACH configurations. AN 205-*l* may transmit MIB in SSs, and RMSI via PDSCH indicating the same access RACH configuration sent to AN 205-*l* from receiving AN 205-*k*.

Figure 5:
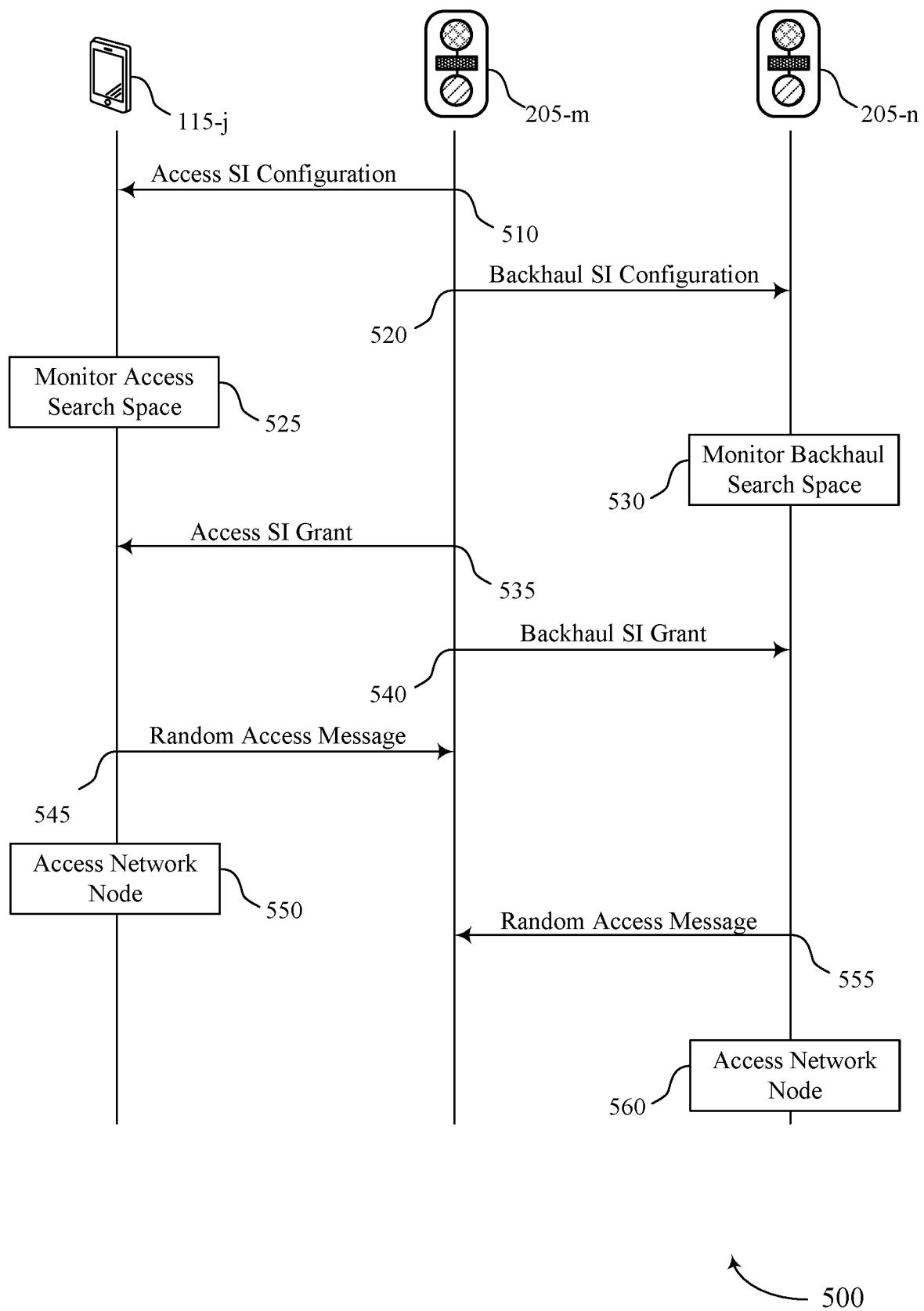
FIG. 5 illustrates an example of a process flow that supports SI for access and backhaul in accordance with aspects of the present disclosure.

FIG. 5 illustrates an example of a process flow 500 that supports SI for access and backhaul in accordance with aspects of the present disclosure. In some examples, process flow 500 may implement aspects of wireless communications systems 100 or 200. In the following description of the process flow 500, the operations between the receiving node 205-*m* and node 205-*n* and UE 115-*j* may correspond to uplink or downlink signaling over wireless backhaul links and/or wireless links. Receiving AN 205-*m* and AN 205-*n* may be configured with both ANF and UEF functionality, while UE 115-*j* may be configured for only UEF.

At 510, receiving AN 205-*m* may transmit to UE 115-*j* an access SI configuration that indicates an access search space and an access CORESET. The access SI configuration may indicate one or both of an access search space and access CORESET. In response, at 525, UE 115-*j* may monitor the access search space and the access CORESET for an access-specific SI-RNTI.

At 520, receiving node 205-*m* may transmit a backhaul SI configuration to AN 205-*n*. The backhaul SI may indicate either one or both of a search space and CORESET for an SI grant. At 530, AN 205-*n* may monitor a backhaul search space and a backhaul CORESET indicated by the backhaul SI configuration received at 520. AN 205-*n* may monitor for a backhaul-specific SI-RNTI. In some cases, the access and backhaul SI-RNTIs are different. Further, at least a portion of the backhaul search space may be the same as a portion of the access search space. In some instances, at least a portion of the backhaul CORESET may be the same as a portion of the access CORESET.

At 535, receiving node 205-*m* transmits and access SI grant to UE 115-*j*. In some cases, UE 115-*j* may receive the access SI grant via a PDCCH. The access SI grant may schedule an SI message via a PDSCH. In some cases, UE 115-*j* may use the access SI-RNTI received at 510 to descramble one or more CRC bits of the PDCCH.

At 540, receiving AN 205-*m* may transmit a backhaul SI grant to AN 205-*n*. In some cases, AN 205-*n* may receive the backhaul SI grant via PDCCH, where the backhaul SI grant schedules an SI message via PDSCH.

At 545, UE 115-*j* may send a random access message to the receiving AN 205-*m*. The random access message may be sent according to a configuration indicated in the access SI. At 550, UE 115-*j* may access receiving AN 205-*m* based on the access SI.

At 555, AN 205-*n* may send a random access message to the receiving AN 205-*m*. AN 205-*n* may send the random access message based on the backhaul SI. In some cases, 205-*n* may determine that the transmission was unsuccessful and send a second random access message according to the access SI. At 560, AN 205-*n* may access receiving node 205-*m* based on the backhaul SI, the access SI, or both.

Figure 6:
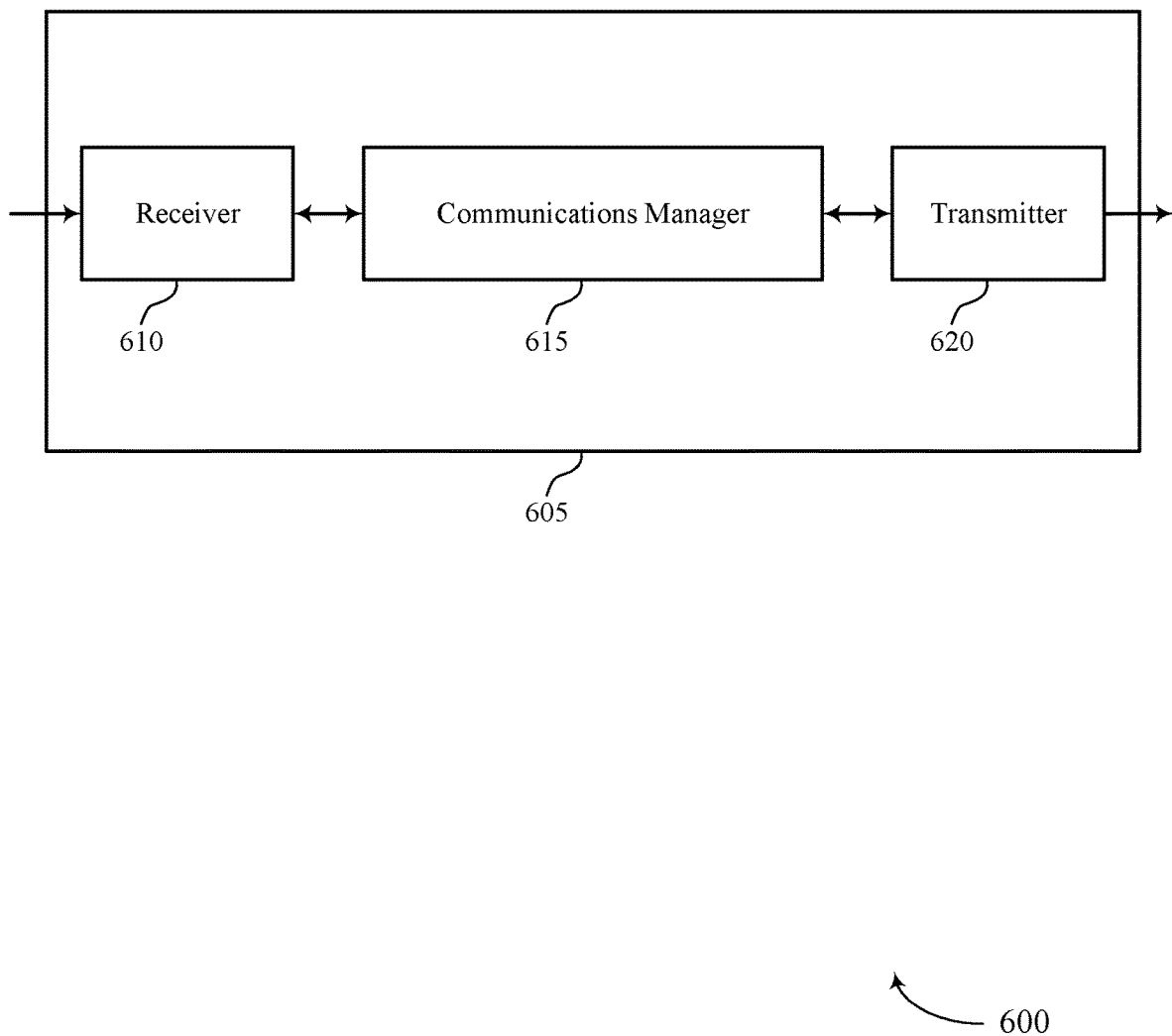
FIGS. 6 and 7 show block diagrams of devices that support SI for access and backhaul in accordance with aspects of the present disclosure.

FIG. 6 shows a block diagram 600 of a device 605 that supports SI for access and backhaul in accordance with aspects of the present disclosure. The device 605 may be an example of aspects of a UE 115 or base station 105 as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to system information for access and backhaul, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The communications manager 615 may receive, at a relay device in a wireless network, a backhaul SI configuration from a network node in the wireless network, determine, based on the backhaul SI configuration, backhaul SI for communication with the network node or another network node of the wireless network, where the backhaul SI is different from access SI used by one or more wireless devices to access a cell supported by the relay device, and access the network node or the other network node based on the backhaul SI, the access SI, or both. The communications manager 615 may also receive, at a relay device in a wireless network, an access SI configuration and a backhaul SI configuration from a network node in the wireless network, determine, based on the access SI configuration, access SI for one or more devices to access a cell supported by the relay device, where the access SI is different from backhaul SI used for communication with the network node or another network node of the wireless network, and transmit a synchronization signal (SS) that indicates the access SI to the one or more devices in the wireless network. The communications manager 615 may be an example of aspects of the communications manager 910 or 1010 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
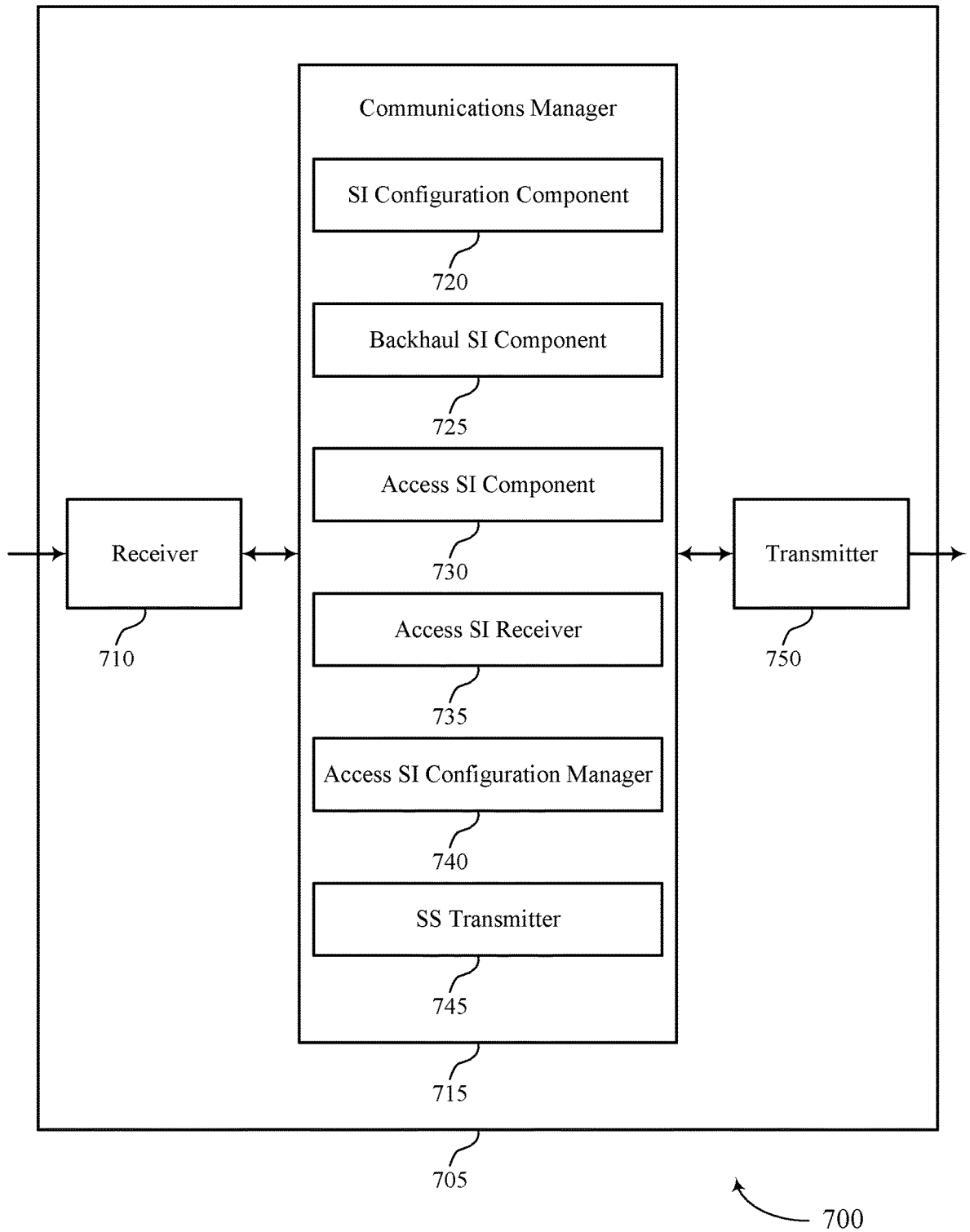

FIG. 7 shows a block diagram 700 of a device 705 that supports SI for access and backhaul in accordance with aspects of the present disclosure. The device 705 may be an example of aspects of a device 605, a UE 115, or a base station 105 as described herein. The device 705 may include a receiver 710, a communications manager 715, and a transmitter 750. The device 705 may also include a processor. Each of these components may be in communication with one another (e.g., via one or more buses).

Receiver 710 may receive information such as packets, user data, or control information associated with various information channels (e.g., control channels, data channels, and information related to system information for access and backhaul, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a SI configuration component 720, a backhaul SI component 725, an access SI component 730, an access SI receiver 735, an access SI configuration manager 740, and an SS transmitter 745. The communications manager 715 may be an example of aspects of the communications manager 910 or 1010 as described herein.

The SI configuration component 720 may receive, at a relay device in a wireless network, a backhaul SI configuration from a network node in the wireless network.

The backhaul SI component 725 may determine, based on the backhaul SI configuration, backhaul SI for communication with the network node or another network node of the wireless network, where the backhaul SI is different from access SI used by one or more wireless devices to access a cell supported by the relay device.

The access SI component 730 may access the network node or the other network node based on the backhaul SI, the access SI, or both.

The access SI receiver 735 may receive, at a relay device in a wireless network, an access SI configuration and a backhaul SI configuration from a network node in the wireless network.

The access SI configuration manager 740 may determine, based on the access SI configuration, access SI for one or more devices to access a cell supported by the relay device, where the access SI is different from backhaul SI used for communication with the network node or another network node of the wireless network.

The SS transmitter 745 may transmit an SS that indicates the access SI to the one or more devices in the wireless network.

Transmitter 750 may transmit signals generated by other components of the device 705. In some examples, the transmitter 750 may be collocated with a receiver 710 in a transceiver module. For example, the transmitter 750 may be an example of aspects of the transceiver 920 or 1020 as described with reference to FIGS. 9 and 10. The transmitter 750 may utilize a single antenna or a set of antennas.

Figure 8:
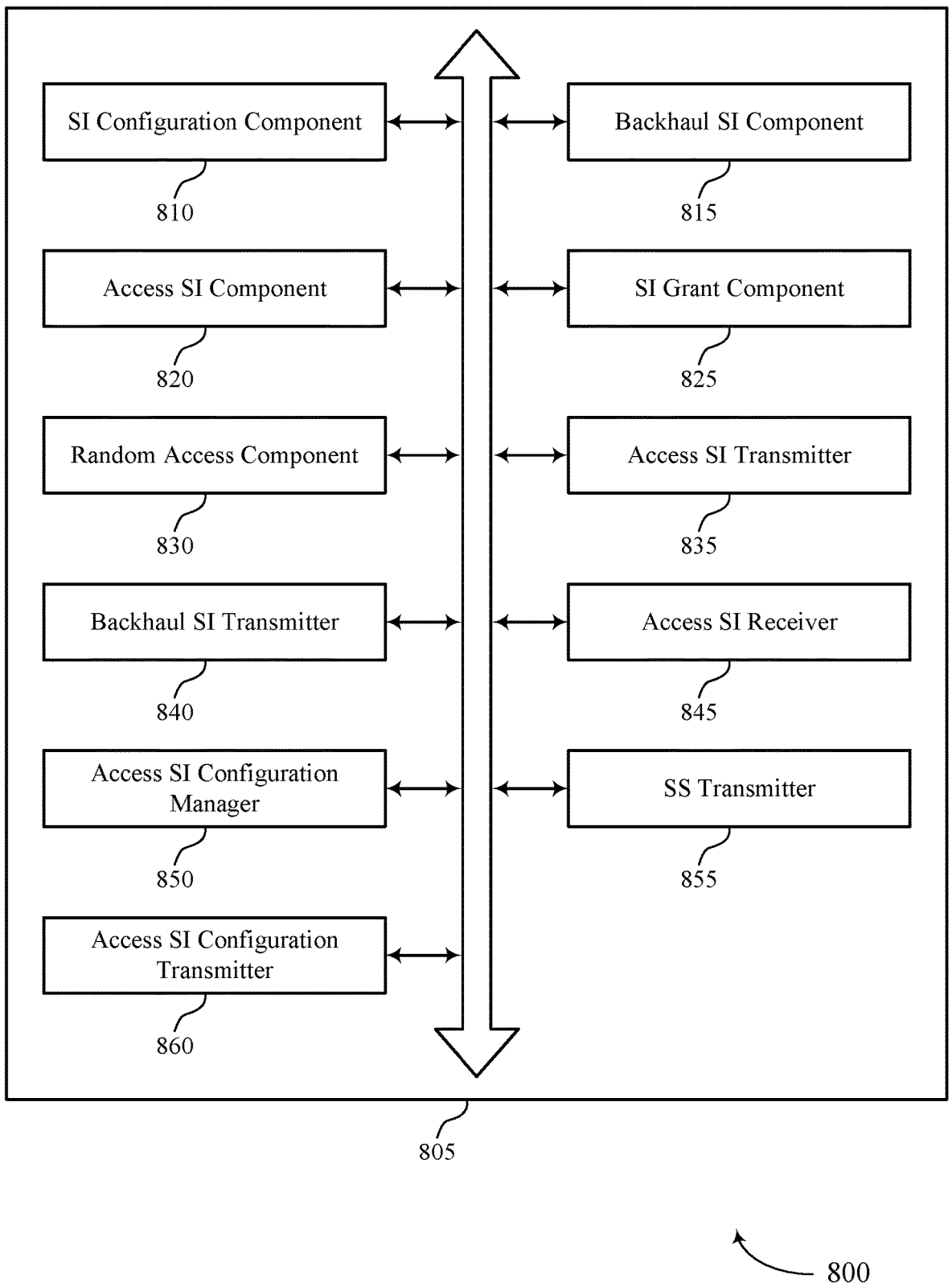
FIG. 8 shows a block diagram of a device that supports SI for access and backhaul in accordance with aspects of the present disclosure.

FIG. 8 shows a block diagram 800 of a communications manager 805 that supports SI for access and backhaul in accordance with aspects of the present disclosure. The communications manager 805 may be an example of aspects of a communications manager 615, a communications manager 715, or a communications manager 910 described herein. The communications manager 805 may include a SI configuration component 810, a backhaul SI component 815, an access SI component 820, a SI grant component 825, a random access component 830, an access SI transmitter 835, a backhaul SI transmitter 840, an access SI receiver 845, an access SI configuration manager 850, an SS transmitter 855, and an access SI configuration transmitter 860. Each of these modules may communicate, directly or indirectly, with one another (e.g., via one or more buses).

The SI configuration component 810 may receive, at a relay device in a wireless network, a backhaul SI configuration from a network node in the wireless network. In some examples, the SI configuration component 810 may receive, at the relay device, an access SI configuration that indicates an access search space and an access CORESET. In some examples, the SI configuration component 810 may receive, at the relay device, an access SI configuration from the network node in the wireless network. In some examples, the SI configuration component 810 may receive a broadcast channel from the network node that includes a common MIB. In some examples, the SI configuration component 810 may receive, from the network node, DCI. In some cases, the backhaul SI configuration indicates one or both of a search space and CORESET for an SI grant. In some cases, the access-specific SI-RNTI and the backhaul-specific SI-RNTI are different. In some cases, at least a portion of the backhaul search space is the same as at least a portion of the access search space. In some cases, at least a portion of the backhaul CORESET is the same as at least a portion of the access CORESET. In some cases, the access SI configuration indicates one or both of a search space and CORESET for an SI grant. In some cases, the backhaul SI includes a CORESET or a search space different from the access SI.

The backhaul SI component 815 may determine, based on the backhaul SI configuration, backhaul SI for communication with the network node or another network node of the wireless network, where the backhaul SI is different from access SI used by one or more wireless devices to access a cell supported by the relay device. In some examples, the backhaul SI component 815 may monitor a backhaul search space and a backhaul CORESET indicated by the backhaul SI configuration for a backhaul-specific SI-RNTI. In some examples, the backhaul SI component 815 may determine a backhaul CORESET or a backhaul search space for communications with the network node based on the common MIB. In some examples, the backhaul SI component 815 may monitor the backhaul CORESET or the backhaul search space for a backhaul-specific SI-RNTI. In some examples, the backhaul SI component 815 may determine the backhaul CORESET or the backhaul search space based on a backhaul-specific relationship table that maps the common MIB to the backhaul CORESET or the backhaul search space. In some examples, the backhaul SI component 815 may receive backhaul RMSI using a second set of transmission beams, where at least one transmission beam of the second set of transmission beams is in a different direction than at least one transmission beam of the first set of transmission beams.

In some cases, the backhaul SI includes a backhaul-specific SI-RNTI, an access-specific SI-RNTI for the access SI, or a combination thereof. In some cases, a content of RMSI for one or more reference signals (RSs) is backhaul specific, where the one or more RSs include an SS block or a CSI RS. In some cases, the RSs may be associated with different transmission beam directions. In some cases, a content of backhaul-specific RMSI for a first RSs is different from the content of backhaul-specific RMSI for a second RS that is different from the first RS.

The access SI component 820 may access the network node or the other network node based on the backhaul SI, the access SI, or both. In some examples, the access SI component 820 may receive, at the relay device, an SS that indicates the access SI. In some examples, the access SI component 820 may monitor the access search space and the access CORESET for an access-specific SI-RNTI. In some examples, the access SI component 820 may determine, based on the access SI configuration, access SI for one or more wireless devices to access the cell supported by the relay device. In some examples, the access SI component 820 may determine an access CORESET or an access search space based on the common MIB, where the access CORESET is different from the backhaul CORESET or the access search space is different from the backhaul search space. In some examples, the access SI component 820 may determine the access CORESET or the access search space based on an access-specific relationship table that maps the common MIB to the access CORESET or the access search space. In some examples, the access SI component 820 may determine an access CORESET or an access search space based on the common MIB, where the access CORESET is different from the backhaul CORESET or the access search space is different from the backhaul search space. In some examples, the access SI component 820 may receive an SS that indicates the access SI to one or more devices in the wireless network based on the access CORESET or the access search space.

In some examples, the access SI component 820 may receive access RMSI using a first set of transmission beams. In some examples, the access SI component 820 may monitor a search space indicated by the access SI for an access-specific RNTI. In some examples, the access SI component 820 may scramble DCI based on an access-specific RNTI. In some examples, the access SI component 820 may generate a demodulation reference signal (DMRS) based on an access-specific RNTI. In some examples, the access SI component 820 may generate a PDSCH based on an access-specific RNTI. In some examples, the access SI component 820 may descramble the DCI based on an access-specific RNTI. In some cases, the DMRS is associated with a PDCCH or PDSCH. In some examples, the access SI component 20 may generate a DMRS based on an access-specific RNTI. In some instances, the access SI component 20 may generate a PDSCH based on an access-specific RNTI. In some examples, the access SI component 820 may receive, from the network node, a DMRS based on an access-specific RNTI. In some examples, the access SI component 820 may receive, from the network node, a PDSCH based on an access-specific RNTI. In some cases, the DMRS is associated with a PDCCH or a PDSCH.

The SI grant component 825 may receive, based on the backhaul SI configuration, a PDCCH conveying the SI grant, where the SI grant schedules an SI message via PDSCH.

In some examples, the SI grant component 825 may receive, based on the access SI configuration, a PDCCH conveying the SI grant, where the SI grant schedules an SI message via PDSCH. In some examples, the SI grant component 825 may descramble one or more CRC bits using the access SI-RNTI. In some examples, the SI grant component 825 may transmit, based on the access SI configuration, a PDCCH conveying the SI grant, where the SI grant schedules an SI message via PDSCH. In some examples, the SI grant component 825 may scramble one or more CRC bits using the access SI-RNTI.

The random access component 830 may transmit, to the network node or another network node, a first random access message based on the backhaul SI. In some examples, the random access component 830 may determine that a random access procedure was unsuccessful based on transmitting the first random access message. In some examples, the random access component 830 may transmit, to the network node or the other network node, a second random access message based on the access SI.

The access SI transmitter 835 may transmit an SS that indicates the access SI to one or more devices in the wireless network. In some examples, the access SI transmitter 835 may transmit a SS that indicates the access SI to one or more devices in the wireless network based on the access CORESET or the access search space. In some examples, the access SI transmitter 835 may transmit access RMSI using a first set of transmission beams. In some examples, the access SI transmitter 835 may transmit the scrambled DCI to one or more devices in the wireless network. In some cases, the DMRS is associated with a PDCCH or PDSCH. In some examples, the access SI transmitter 835 may transmit the DMRS to one or more devices in the wireless network. In some examples, the access SI transmitter 835 may transmit the PDSCH to one or more devices in the wireless network. In some cases, the DMRS is associated with a PDCCH or a PDSCH.

The backhaul SI transmitter 840 may transmit backhaul RMSI using a second set of transmission beams, where at least one transmission beam of the second set of transmission beams is in a different direction than at least one transmission beam of the first set of transmission beams.

The access SI receiver 845 may receive, at a relay device in a wireless network, an access SI configuration and a backhaul SI configuration from a network node in the wireless network.

The access SI configuration manager 850 may determine, based on the access SI configuration, access SI for one or more devices to access a cell supported by the relay device, where the access SI is different from backhaul SI used for communication with the network node or another network node of the wireless network. In some examples, the access SI configuration manager 850 may transmit, to the one or more devices, an access SI configuration that indicates an access search space and an access CORESET. In some examples, the access SI configuration manager 850 may scramble DCI based on an access-specific RNTI. In some examples, the access SI configuration manager 850 may generate a DMRS based on an access-specific RNTI. In some examples, the access SI configuration manager 850 may generate a PDSCH based on an access-specific RNTI.

The SS transmitter 855 may transmit an SS that indicates the access SI to the one or more devices in the wireless network.

The access SI configuration transmitter 860 may transmit the scrambled DCI to the one or more devices in the wireless network. In some examples, the access SI configuration transmitter 860 may transmit the DMRS to the one or more devices in the wireless network. In some examples, the access SI configuration transmitter 860 may transmit the PDSCH to the one or more devices in the wireless network.

Figure 9:
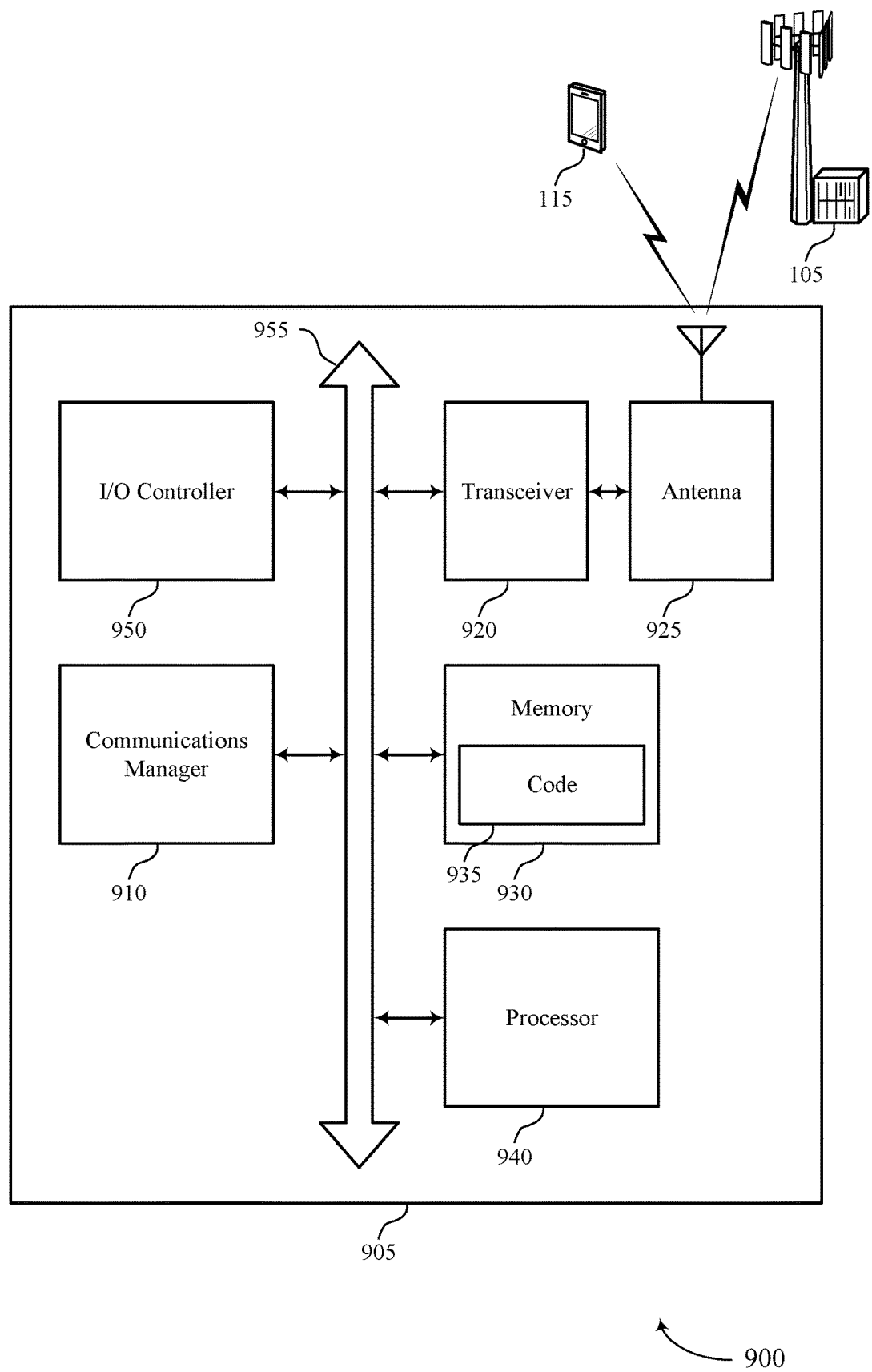
FIG. 9 shows a diagram of a system including a user equipment (UE) that supports SI for access and backhaul in accordance with aspects of the present disclosure.

FIG. 9 shows a diagram of a system 900 including a device 905 that supports SI for access and backhaul in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910 may receive, at a relay device in a wireless network, a backhaul SI configuration from a network node in the wireless network, determine, based on the backhaul SI configuration, backhaul SI for communication with the network node or another network node of the wireless network, where the backhaul SI is different from access SI used by one or more wireless devices to access a cell supported by the relay device, and access the network node or the other network node based on the backhaul SI, the access SI, or both. The communications manager 910 may also receive, at a relay device in a wireless network, an access SI configuration and a backhaul SI configuration from a network node in the wireless network, determine, based on the access SI configuration, access SI for one or more devices to access a cell supported by the relay device, where the access SI is different from backhaul SI used for communication with the network node or another network node of the wireless network, and transmit an SS that indicates the access SI to the one or more devices in the wireless network.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting SI for access and backhaul).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
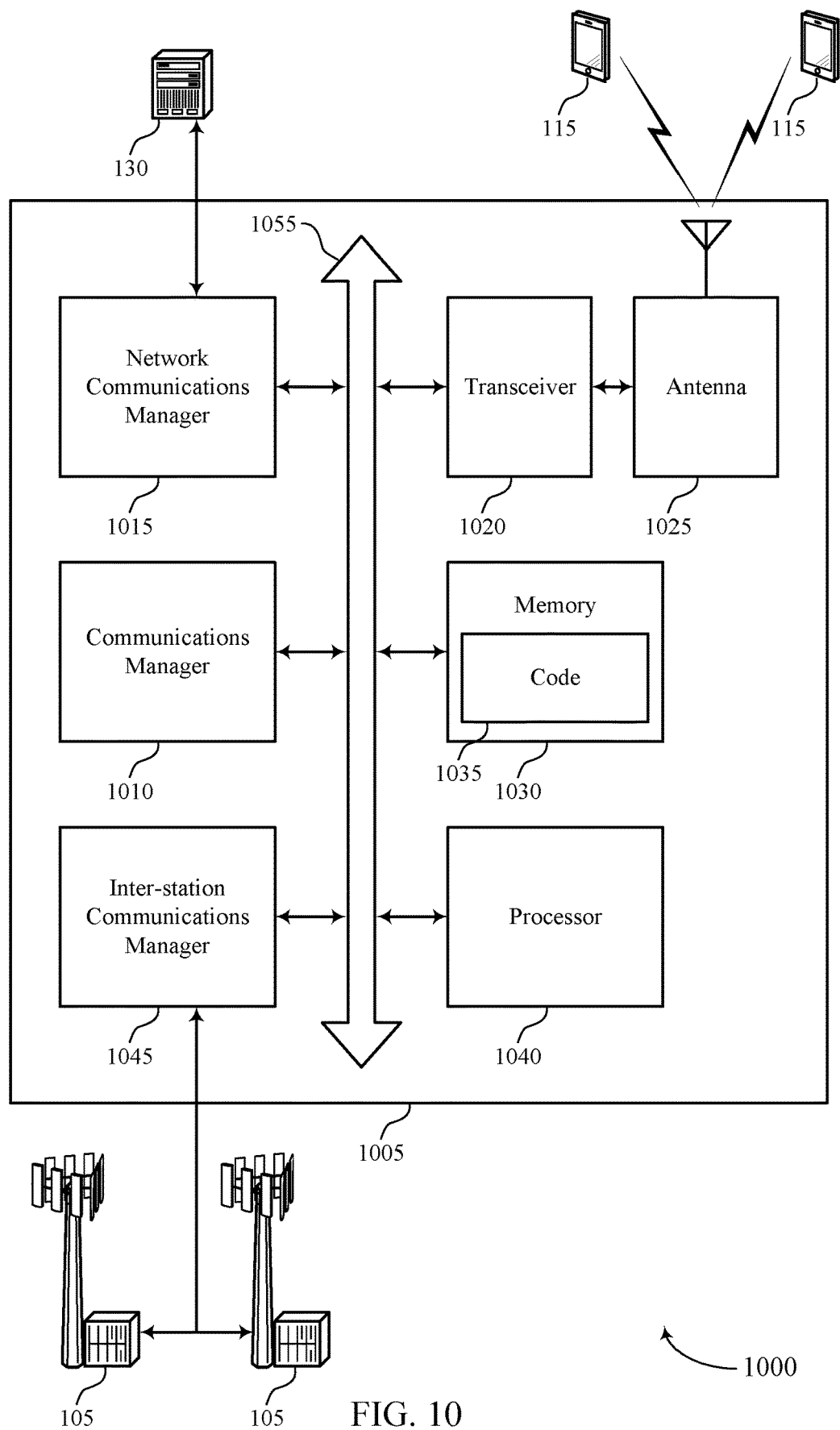
FIG. 10 shows a diagram of a system including a base station that supports SI for access and backhaul in accordance with aspects of the present disclosure.

FIG. 10 shows a diagram of a system 1000 including a device 1005 that supports SI for access and backhaul in accordance with aspects of the present disclosure. The device 1005 may be an example of or include the components of device 605, device 705, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

The communications manager 1010 may receive, at a relay device in a wireless network, a backhaul SI configuration from a network node in the wireless network, determine, based on the backhaul SI configuration, backhaul SI for communication with the network node or another network node of the wireless network, where the backhaul SI is different from access SI used by one or more wireless devices to access a cell supported by the relay device, and access the network node or the other network node based on the backhaul SI, the access SI, or both. The communications manager 1010 may also receive, at a relay device in a wireless network, an access SI configuration and a backhaul SI configuration from a network node in the wireless network, determine, based on the access SI configuration, access SI for one or more devices to access a cell supported by the relay device, where the access SI is different from backhaul SI used for communication with the network node or another network node of the wireless network, and transmit an SS that indicates the access SI to the one or more devices in the wireless network.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting SI for access and backhaul).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
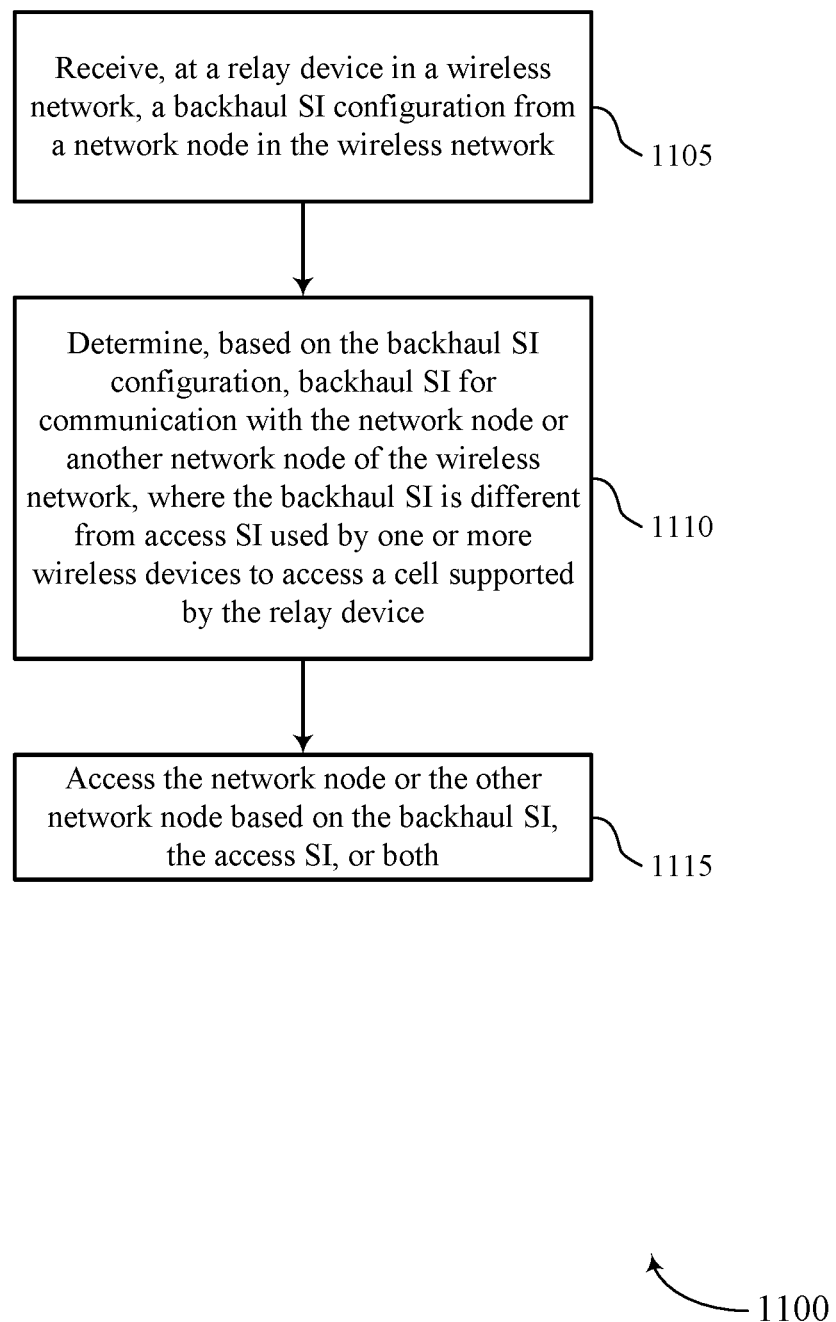
FIGS. 11 through 16 show flowcharts illustrating methods that support SI for access and backhaul in accordance with aspects of the present disclosure.

FIG. 11 shows a flowchart illustrating a method 1100 that supports SI for access and backhaul in accordance with aspects of the present disclosure. The operations of method 1100 may be implemented by a UE 115 or base station 105 or its components as described herein. For example, the operations of method 1100 may be performed by a communications manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may receive, at a relay device in a wireless network, a backhaul SI configuration from a network node in the wireless network. The operations of 1105 may be performed according to the methods described herein. In some examples, aspects of the operations of 1105 may be performed by a SI configuration component as described with reference to FIGS. 6 through 10.

At 1110, the UE or base station may determine, based on the backhaul SI configuration, backhaul SI for communication with the network node or another network node of the wireless network, where the backhaul SI is different from access SI used by one or more wireless devices to access a cell supported by the relay device. The operations of 1110 may be performed according to the methods described herein. In some examples, aspects of the operations of 1110 may be performed by a backhaul SI component as described with reference to FIGS. 6 through 10.

At 1115, the UE or base station may access the network node or the other network node based on the backhaul SI, the access SI, or both. The operations of 1115 may be performed according to the methods described herein. In some examples, aspects of the operations of 1115 may be performed by an access SI component as described with reference to FIGS. 6 through 10.

Figure 12:
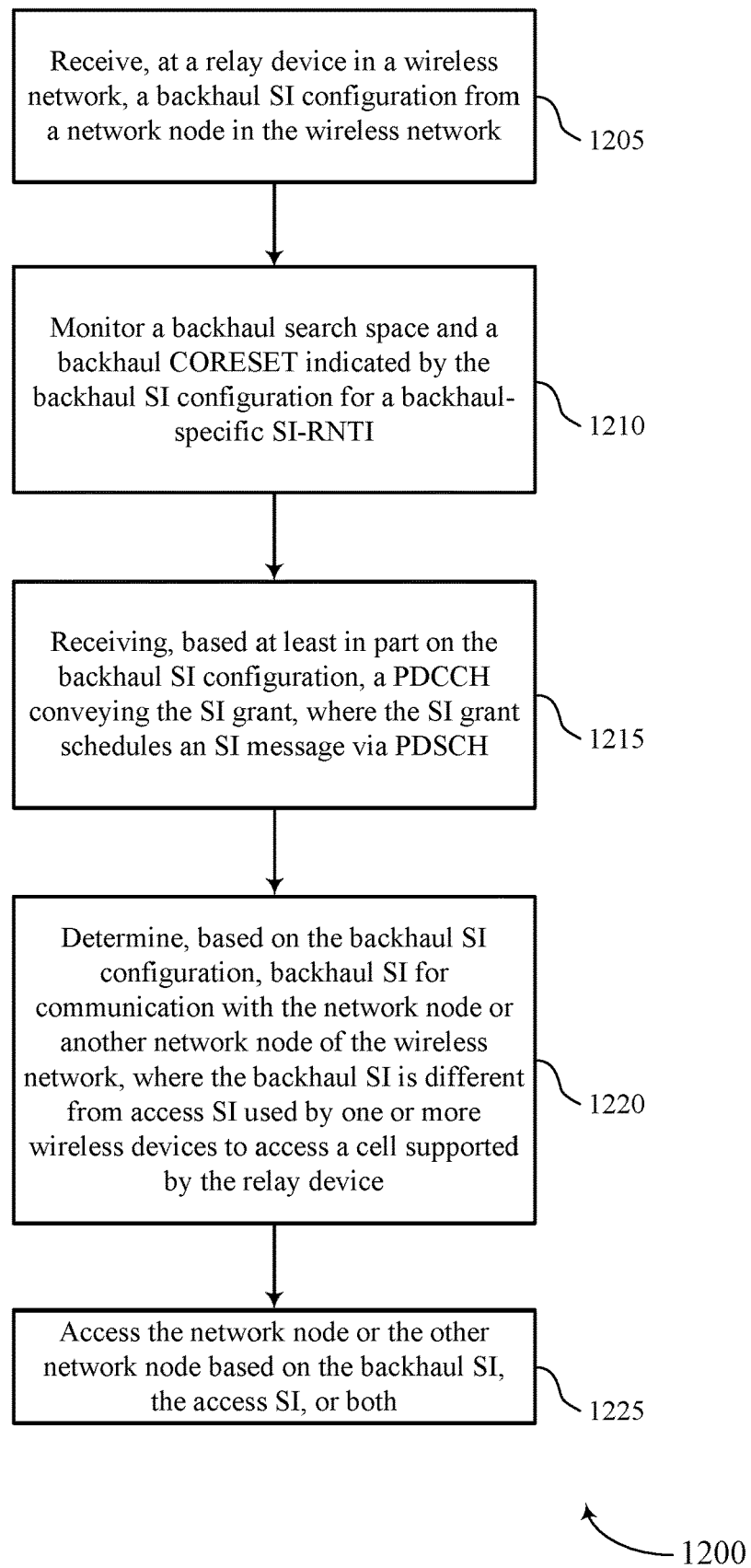

FIG. 12 shows a flowchart illustrating a method 1200 that supports SI for access and backhaul in accordance with aspects of the present disclosure. The operations of method 1200 may be implemented by a UE 115 or base station 105 or its components as described herein. For example, the operations of method 1200 may be performed by a communications manager as described with reference to FIGS. 6 to 10. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may receive, at a relay device in a wireless network, a backhaul SI configuration from a network node in the wireless network. The operations of 1205 may be performed according to the methods described herein. In some examples, aspects of the operations of 1205 may be performed by a SI configuration component as described with reference to FIGS. 6 to 10.

At 1210, the UE or base station may monitor a backhaul search space and a backhaul CORESET indicated by the backhaul SI configuration for a backhaul-specific SI-RNTI. The operations of 1210 may be performed according to the methods described herein. In some examples, aspects of the operations of 1210 may be performed by a backhaul SI component as described with reference to FIGS. 6 to 10.

At 1215, the UE or base station may receive, based on the backhaul SI configuration, a PDCCH conveying the SI grant, where the SI grant schedules an SI message via PDSCH. The operations of 1215 may be performed according to the methods described herein. In some examples, aspects of the operations of 1215 may be performed by a backhaul SI component as described with reference to FIGS. 6 to 10.

At 1220, the UE or base station may determine, based on the backhaul SI configuration, backhaul SI for communication with the network node or another network node of the wireless network, where the backhaul SI is different from access SI used by one or more wireless devices to access a cell supported by the relay device. The operations of 1220 may be performed according to the methods described herein. In some examples, aspects of the operations of 1220 may be performed by a backhaul SI component as described with reference to FIGS. 6 to 10.

At 1225, the UE or base station may access the network node or the other network node based on the backhaul SI, the access SI, or both. The operations of 1225 may be performed according to the methods described herein. In some examples, aspects of the operations of 1225 may be performed by an access SI component as described with reference to FIGS. 6 to 10.

Figure 13:
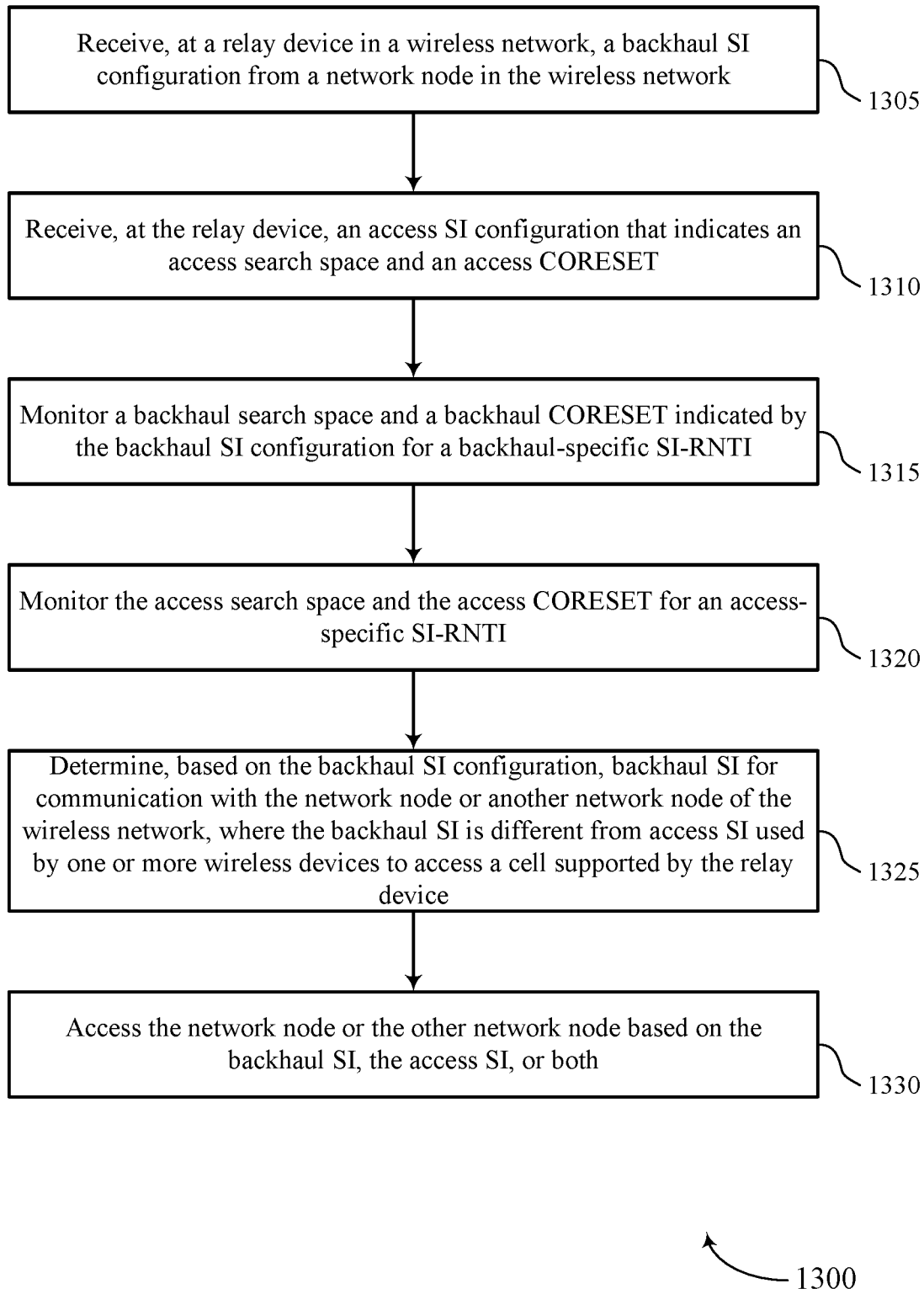

FIG. 13 shows a flowchart illustrating a method 1300 that supports SI for access and backhaul in accordance with aspects of the present disclosure. The operations of method 1300 may be implemented by a UE 115 or base station 105 or its components as described herein. For example, the operations of method 1300 may be performed by a communications manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may receive, at a relay device in a wireless network, a backhaul SI configuration from a network node in the wireless network. The operations of 1305 may be performed according to the methods described herein. In some examples, aspects of the operations of 1305 may be performed by a SI configuration component as described with reference to FIGS. 6 through 10.

At 1310, the UE or base station may receive, at the relay device, an access SI configuration that indicates an access search space and an access CORESET. The operations of 1310 may be performed according to the methods described herein. In some examples, aspects of the operations of 1310 may be performed by a SI configuration component as described with reference to FIGS. 6 through 10.

At 1315, the UE or base station may monitor a backhaul search space and a backhaul CORESET indicated by the backhaul SI configuration for a backhaul-specific SI-RNTI. The operations of 1315 may be performed according to the methods described herein. In some examples, aspects of the operations of 1315 may be performed by a backhaul SI component as described with reference to FIGS. 6 through 10.

At 1320, the UE or base station may monitor the access search space and the access CORESET for an access-specific SI-RNTI. The operations of 1320 may be performed according to the methods described herein. In some examples, aspects of the operations of 1320 may be performed by an access SI component as described with reference to FIGS. 6 through 10.

At 1325, the UE or base station may determine, based on the backhaul SI configuration, backhaul SI for communication with the network node or another network node of the wireless network, where the backhaul SI is different from access SI used by one or more wireless devices to access a cell supported by the relay device. The operations of 1325 may be performed according to the methods described herein. In some examples, aspects of the operations of 1325 may be performed by a backhaul SI component as described with reference to FIGS. 6 through 10.

At 1330, the UE or base station may access the network node or the other network node based on the backhaul SI, the access SI, or both. The operations of 1330 may be performed according to the methods described herein. In some examples, aspects of the operations of 1330 may be performed by an access SI component as described with reference to FIGS. 6 through 10.

Figure 14:
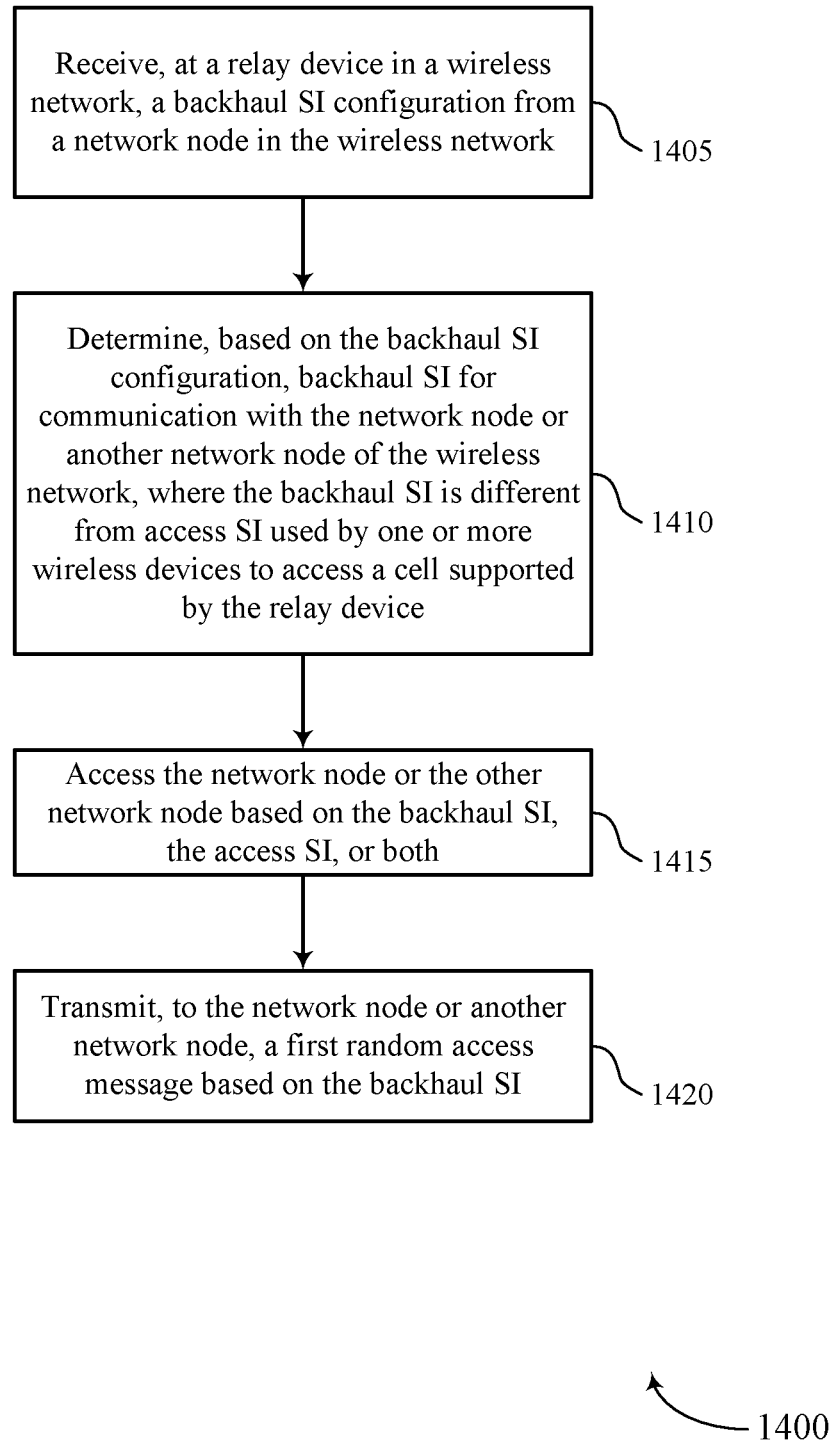

FIG. 14 shows a flowchart illustrating a method 1400 that supports SI for access and backhaul in accordance with aspects of the present disclosure. The operations of method 1400 may be implemented by a UE 115 or base station 105 or its components as described herein. For example, the operations of method 1400 may be performed by a communications manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may receive, at a relay device in a wireless network, a backhaul SI configuration from a network node in the wireless network. The operations of 1405 may be performed according to the methods described herein. In some examples, aspects of the operations of 1405 may be performed by a SI configuration component as described with reference to FIGS. 6 through 10.

At 1410, the UE or base station may determine, based on the backhaul SI configuration, backhaul SI for communication with the network node or another network node of the wireless network, where the backhaul SI is different from access SI used by one or more wireless devices to access a cell supported by the relay device. The operations of 1410 may be performed according to the methods described herein. In some examples, aspects of the operations of 1410 may be performed by a backhaul SI component as described with reference to FIGS. 6 through 10.

At 1415, the UE or base station may access the network node or the other network node based on the backhaul SI, the access SI, or both. The operations of 1415 may be performed according to the methods described herein. In some examples, aspects of the operations of 1415 may be performed by an access SI component as described with reference to FIGS. 6 through 10.

At 1420, the UE or base station may transmit, to the network node or another network node, a first random access message based on the backhaul SI. The operations of 1420 may be performed according to the methods described herein. In some examples, aspects of the operations of 1420 may be performed by a random access component as described with reference to FIGS. 6 through 10.

Figure 15:
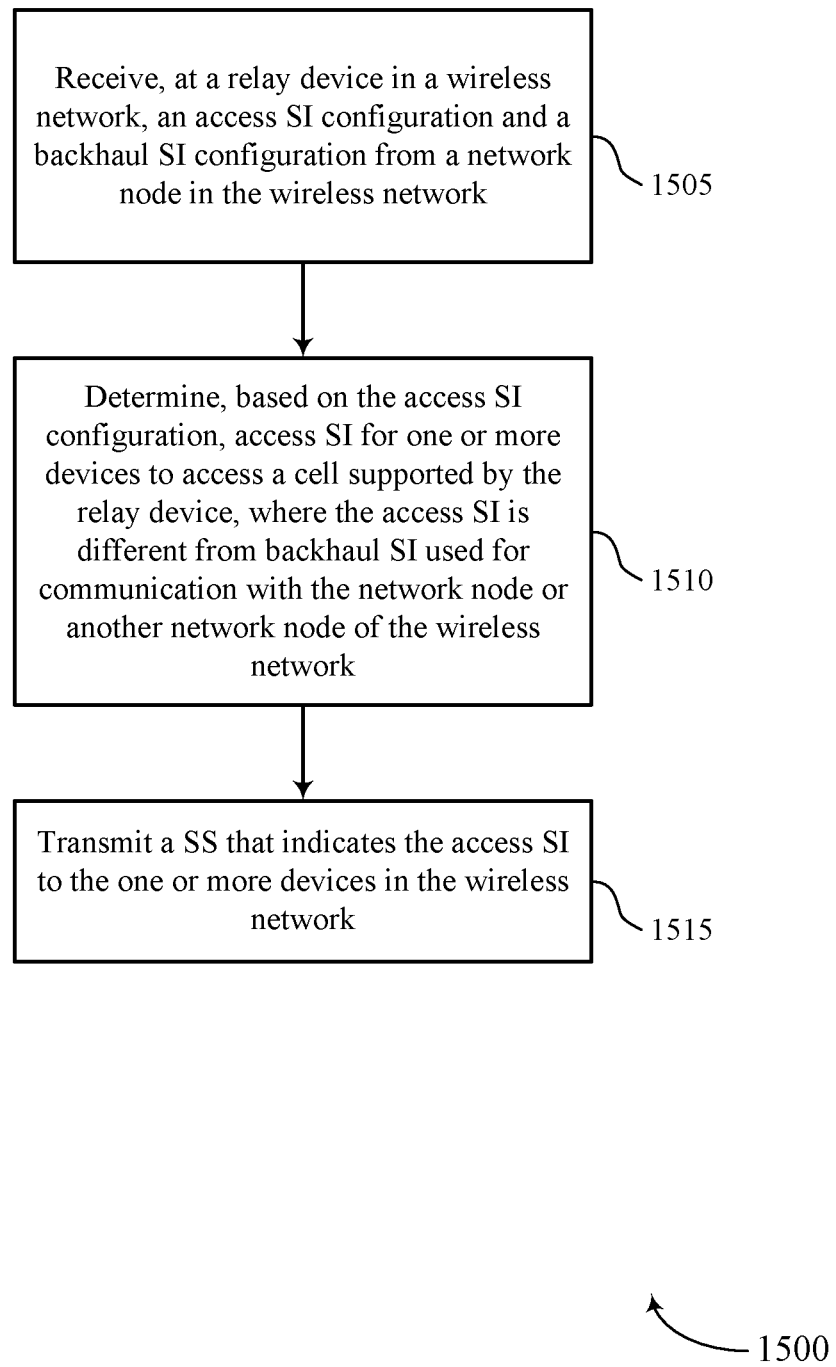

FIG. 15 shows a flowchart illustrating a method 1500 that supports SI for access and backhaul in accordance with aspects of the present disclosure. The operations of method 1500 may be implemented by a UE 115 or base station 105 or its components as described herein. For example, the operations of method 1500 may be performed by a communications manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may receive, at a relay device in a wireless network, an access SI configuration and a backhaul SI configuration from a network node in the wireless network. The operations of 1505 may be performed according to the methods described herein. In some examples, aspects of the operations of 1505 may be performed by an access SI receiver as described with reference to FIGS. 6 through 10.

At 1510, the UE or base station may determine, based on the access SI configuration, access SI for one or more devices to access a cell supported by the relay device, where the access SI is different from backhaul SI used for communication with the network node or another network node of the wireless network. The operations of 1510 may be performed according to the methods described herein. In some examples, aspects of the operations of 1510 may be performed by an access SI configuration manager as described with reference to FIGS. 6 through 10.

At 1515, the UE or base station may transmit an SS that indicates the access SI to the one or more devices in the wireless network. The operations of 1515 may be performed according to the methods described herein. In some examples, aspects of the operations of 1515 may be performed by an SS transmitter as described with reference to FIGS. 6 through 10.

Figure 16:
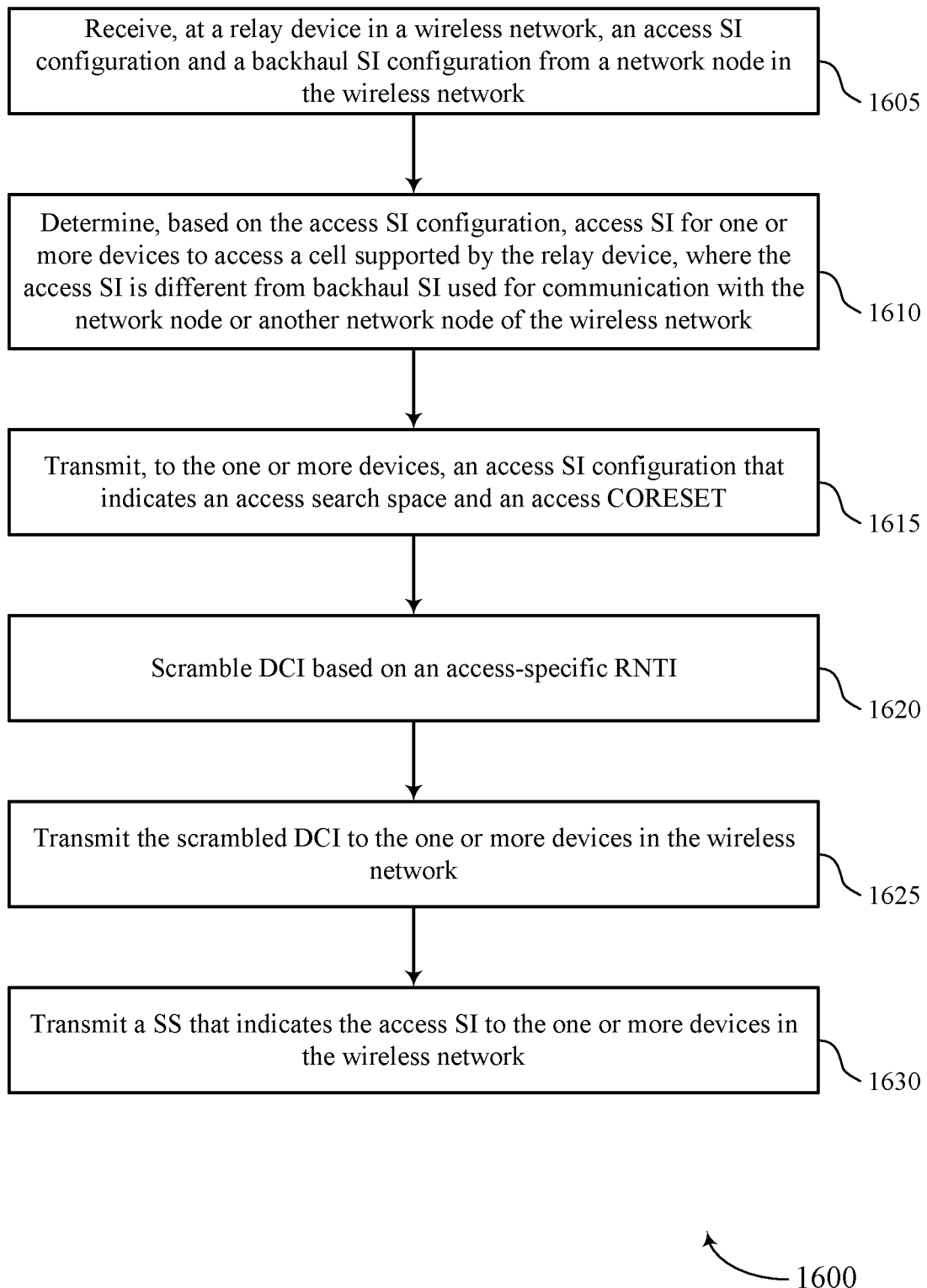

FIG. 16 shows a flowchart illustrating a method 1600 that supports SI for access and backhaul in accordance with aspects of the present disclosure. The operations of method 1600 may be implemented by a UE 115 or base station 105 or its components as described herein. For example, the operations of method 1600 may be performed by a communications manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may receive, at a relay device in a wireless network, an access SI configuration and a backhaul SI configuration from a network node in the wireless network. The operations of 1605 may be performed according to the methods described herein. In some examples, aspects of the operations of 1605 may be performed by an access SI receiver as described with reference to FIGS. 6 through 10.

At 1610, the UE or base station may determine, based on the access SI configuration, access SI for one or more devices to access a cell supported by the relay device, where the access SI is different from backhaul SI used for communication with the network node or another network node of the wireless network. The operations of 1610 may be performed according to the methods described herein. In some examples, aspects of the operations of 1610 may be performed by an access SI configuration manager as described with reference to FIGS. 6 through 10.

At 1615, the UE or base station may transmit, to the one or more devices, an access SI configuration that indicates an access search space and an access CORESET. The operations of 1615 may be performed according to the methods described herein. In some examples, aspects of the operations of 1615 may be performed by an access SI configuration manager as described with reference to FIGS. 6 through 10.

At 1620, the UE or base station may scramble DCI based on an access-specific RNTI. The operations of 1620 may be performed according to the methods described herein. In some examples, aspects of the operations of 1620 may be performed by an access SI configuration manager as described with reference to FIGS. 6 through 10.

At 1625, the UE or base station may transmit the scrambled DCI to the one or more devices in the wireless network. The operations of 1625 may be performed according to the methods described herein. In some examples, aspects of the operations of 1625 may be performed by an access SI configuration transmitter as described with reference to FIGS. 6 through 10.

At 1630, the UE or base station may transmit an SS that indicates the access SI to the one or more devices in the wireless network. The operations of 1630 may be performed according to the methods described herein. In some examples, aspects of the operations of 1630 may be performed by an SS transmitter as described with reference to FIGS. 6 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000x, 1x, etc. IS-856 (TIA-856) is commonly referred to as CDMA2000xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, at a relay device in a wireless network, an access system information (SI) configuration and a backhaul SI configuration from a network node in the wireless network;
   determining, based at least in part on the access SI configuration indicating an access search space to monitor for an access-specific SI radio network temporary identifier (SI-RNTI), access SI for one or more devices in the wireless network to access a cell supported by the relay device, wherein the access SI is different from backhaul SI used for communication with the network node or another network node in the wireless network, and wherein the access search space is different from a backhaul search space indicated by the backhaul SI configuration; and
   transmitting a synchronization signal (SS) that indicates the access SI to the one or more devices.

2. The method of claim 1, wherein at least one of the relay device and network node is an integrated access backhaul (IAB) node.

3. The method of claim 1, wherein the network node is an anchor node.

4. The method of claim 1, further comprising:
transmitting, to the one or more devices, the access SI configuration, wherein the access SI configuration further indicates an access control resource set (CORESET).

5. The method of claim 4, wherein the access SI configuration further indicates one or both of a search space and control resource set (CORESET) for an SI grant.

6. The method of claim 5, further comprising:
transmitting, based at least in part on the access SI configuration, a physical downlink control channel (PDCCH) conveying the SI grant, wherein the SI grant schedules an SI message via physical downlink shared channel (PDSCH).

7. An apparatus for wireless communications, comprising:
a processor,
memory in electronic communication with the processor; and
instructions stored in the memory and executable by the processor to cause the apparatus to:
receive, at a relay device in a wireless network, an access system information (SI) configuration and a backhaul SI configuration from a network node in the wireless network;
determine, based at least in part on the access SI configuration indicating an access search space to monitor for an access-specific SI radio network temporary identifier (SI-RNTI), access SI for one or more devices in the wireless network to access a cell supported by the relay device, wherein the access SI is different from backhaul SI used for communication with the network node or another network node of in the wireless network, and wherein the access search space is different from a backhaul search space indicated by the backhaul SI configuration; and
a transmitter configured to transmit a synchronization signal (SS) that indicates the access SI to the one or more devices.

8. The apparatus of claim 7, wherein at least one of the relay device and network node is an integrated access backhaul (IAB) node.

9. The apparatus of claim 7, wherein the network node is an anchor node.

10. The apparatus of claim 7, wherein the transmitter is further configured to transmit, to the one or more devices, the access SI configuration, and wherein the access SI configuration further indicates an access control resource set (CORESET).

11. The apparatus of claim 10, wherein the access SI configuration further indicates one or both of a search space and control resource set (CORESET) for an SI grant.

12. The apparatus of claim 11, wherein the transmitter is further configured to transmit, based at least in part on the access SI configuration, a physical downlink control channel (PDCCH) conveying the SI grant, wherein the SI grant schedules an SI message via physical downlink shared channel (PDSCH).

13. An apparatus for wireless communications, comprising:
means for receiving, at a relay device in a wireless network, an access system information (SI) configuration and a backhaul SI configuration from a network node in the wireless network;
means for determining, based at least in part on the access SI configuration indicating an access search space to monitor for an access-specific SI radio network temporary identifier (SI-RNTI), access SI for one or more devices in the wireless network to access a cell supported by the relay device, wherein the access SI is different from backhaul SI used for communication with the network node or another network node in the wireless network, and wherein the access search space is different from a backhaul search space indicated by the backhaul SI configuration; and
means for transmitting a synchronization signal (SS) that indicates the access SI to the one or more devices.

14. The apparatus of claim 13, wherein at least one of the relay device and network node is an integrated access backhaul (IAB) node.

15. The apparatus of claim 13, wherein the network node is an anchor node.

16. The apparatus of claim 13, further comprising:
means for transmitting, to the one or more devices, the access SI configuration, wherein the access SI configuration further indicates an access control resource set (CORESET).

17. The apparatus of claim 16, wherein the access SI configuration further indicates one or both of a search space and control resource set (CORESET) for an SI grant.

18. The apparatus of claim 17, further comprising:
means for transmitting, based at least in part on the access SI configuration, a physical downlink control channel (PDCCH) conveying the SI grant, wherein the SI grant schedules an SI message via physical downlink shared channel (PDSCH).

19. A non-transitory computer-readable medium storing code for wireless communications, the code comprising instructions executable by a processor to:
receive, at a relay device in a wireless network, an access system information (SI) configuration and a backhaul SI configuration from a network node in the wireless network;
determine, based at least in part on the access SI configuration indicating an access search space to monitor for an access-specific SI radio network temporary identifier (SI-RNTI), access SI for one or more devices in the wireless network to access a cell supported by the relay device, wherein the access SI is different from backhaul SI used for communication with the network node or another network node in the wireless network, and wherein the access search space is different from a backhaul search space indicated by the backhaul SI configuration; and
transmit a synchronization signal (SS) that indicates the access SI to the one or more devices.

20. The non-transitory computer-readable medium of claim 19, wherein at least one of the relay device and network node is an integrated access backhaul (IAB) node.

21. The non-transitory computer-readable medium of claim 19, wherein the network node is an anchor node.

22. The non-transitory computer-readable medium of claim 19, the code further comprising instructions executable by the processor to:
transmit, to the one or more devices, the access SI configuration, wherein the access SI configuration further indicates an access control resource set (CORESET).

23. The non-transitory computer-readable medium of claim 22, wherein the access SI configuration further indicates one or both of a search space and control resource set (CORESET) for an SI grant.

24. The non-transitory computer-readable medium of claim 23, the code further comprising instructions executable by the processor to:
- transmit, based at least in part on the access SI configuration, a physical downlink control channel (PDCCH) conveying the SI grant, wherein the SI grant schedules an SI message via physical downlink shared channel (PDSCH).

* * * * *